United States Patent
Brown et al.

(10) Patent No.: US 12,042,808 B2
(45) Date of Patent: Jul. 23, 2024

(54) QUICK CONNECT SHOWER HEAD

(71) Applicant: ASSA ABLOY Americas Residential Inc., New Haven, CT (US)

(72) Inventors: Spencer Brislin Brown, Middleton, WI (US); Adam William Tracy, Irvine, CA (US); Oscar Romero, Lake Forest, CA (US); David Downey, Lake Forest, CA (US); Bradley Warren Callahan, Middleton, WI (US); Jianfei Zheng, Xiamen (CN); Minh Doan, Westminster, CA (US); Elena Gorkovenko, Mission Viejo, CA (US); Jan Christopher van Leyen, Mission Viejo, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 106 days.

(21) Appl. No.: 17/698,195

(22) Filed: Mar. 18, 2022

(65) Prior Publication Data

US 2022/0297151 A1    Sep. 22, 2022

Related U.S. Application Data

(60) Provisional application No. 63/163,354, filed on Mar. 19, 2021.

(30) Foreign Application Priority Data

Mar. 11, 2022    (CN) .......................... 202210236343.2

(51) Int. Cl.
| | |
|---|---|
| *B05B 15/06* | (2006.01) |
| *B05B 15/654* | (2018.01) |
| *F16L 37/086* | (2006.01) |

(52) U.S. Cl.
CPC .......... *B05B 15/654* (2018.02); *F16L 37/086* (2013.01)

(58) Field of Classification Search
CPC ......... B05B 15/654; B05B 1/18; F16L 37/086
See application file for complete search history.

(56) References Cited

U.S. PATENT DOCUMENTS

| | | | |
|---|---|---|---|
| 5,033,777 A | 7/1991 | Blenkush | |
| 5,845,943 A | 12/1998 | Ramacier, Jr. et al. | |
| 6,231,089 B1 | 5/2001 | Decler et al. | |

(Continued)

FOREIGN PATENT DOCUMENTS

| | | |
|---|---|---|
| EP | 0621077 A1 | 10/1994 |
| JP | 2020174773 A | 10/2020 |
| WO | 9749496 A1 | 12/1997 |

OTHER PUBLICATIONS

International Search Report and Written Opinion, dated Jul. 1, 2022, for co-pending International Application No. PCT/US2022/020971 (7 pgs.).

(Continued)

*Primary Examiner* — Qingzhang Zhou
(74) *Attorney, Agent, or Firm* — Merchant & Gould P.C.

(57) ABSTRACT

A shower head including first and second coupling elements. One of the coupling elements is a male coupling element and the other coupling element is a female coupling element. The male coupling element is inserted into the female coupling element, and when attached, the male coupling element is overlapped by the female coupling element.

20 Claims, 24 Drawing Sheets

(56) References Cited

U.S. PATENT DOCUMENTS

| | | | |
|---|---|---|---|
| 6,688,654 B2 | 2/2004 | Romero | |
| 7,434,842 B2 | 10/2008 | Schmidt | |
| 7,547,047 B2 | 6/2009 | Decler et al. | |
| 7,695,020 B2 | 4/2010 | Schmidt | |
| 8,764,068 B2 | 7/2014 | Frick et al. | |
| D751,676 S | 3/2016 | Frick et al. | |
| 9,279,530 B2 | 3/2016 | Schmidt | |
| D756,761 S | 5/2016 | Frick et al. | |
| 9,671,051 B2 | 6/2017 | Frick | |
| 9,687,860 B2 | 6/2017 | Huffington et al. | |
| 9,689,516 B2 | 6/2017 | Frick et al. | |
| 10,288,204 B2 | 5/2019 | Ohms | |
| 10,376,903 B2 | 8/2019 | Chen et al. | |
| 10,584,819 B2 | 3/2020 | Greco et al. | |
| 10,711,931 B2 | 7/2020 | Downs et al. | |
| 10,975,982 B2 | 4/2021 | Wilhelm | |
| 11,067,210 B2 | 7/2021 | Vranish | |
| 11,215,304 B2 | 1/2022 | Greco et al. | |
| 2004/0217196 A1* | 11/2004 | Yurek, Jr. | F16L 37/0841 239/289 |
| 2017/0050197 A1* | 2/2017 | Huffington | B05B 9/01 |
| 2019/0242510 A1 | 8/2019 | Klein et al. | |
| 2020/0300396 A1 | 9/2020 | Burdge et al. | |
| 2020/0384494 A1 | 12/2020 | Miller et al. | |

OTHER PUBLICATIONS

PCT International Preliminary Report on Patentability in Application PCT/US2022/020971, mailed Sep. 28, 2023, 6 pages.

\* cited by examiner

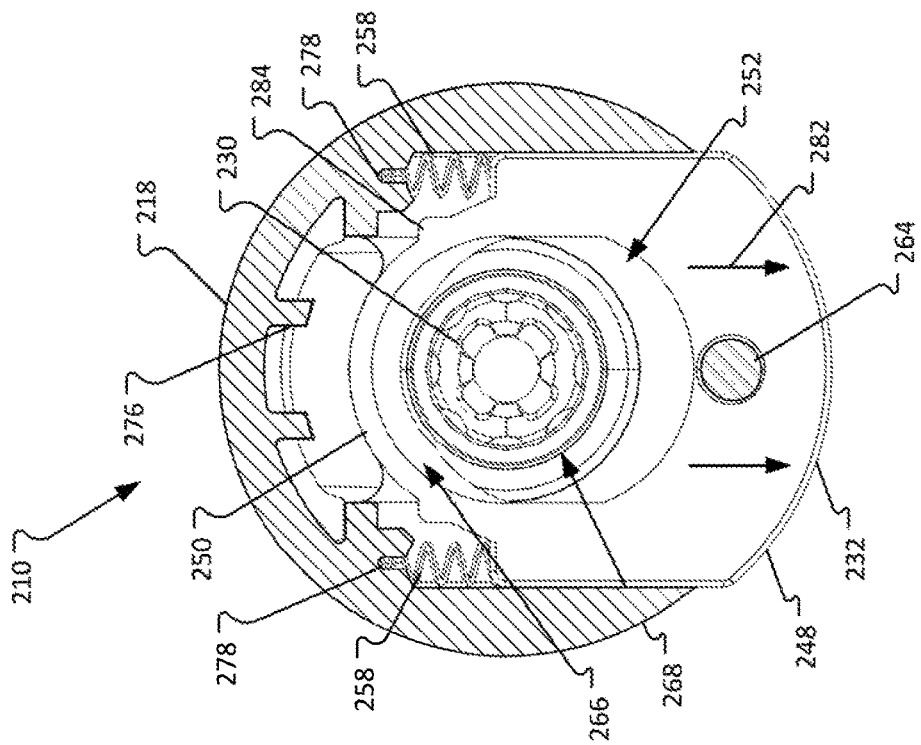
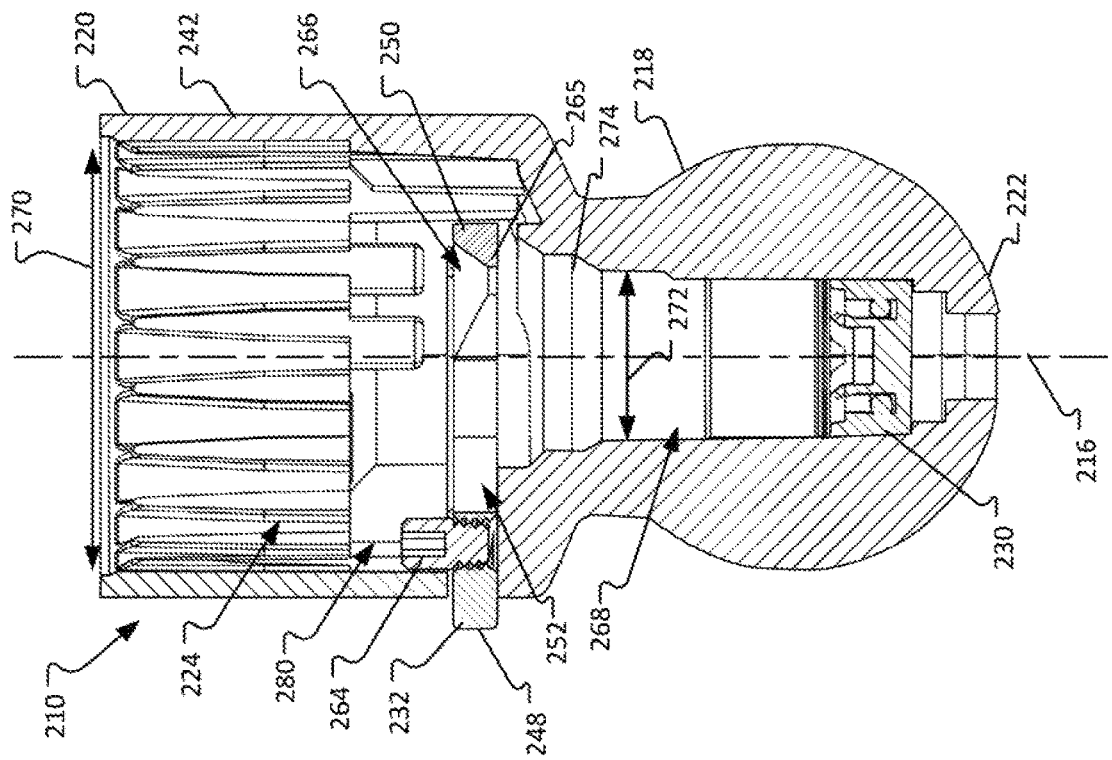
FIG. 19
FIG. 18

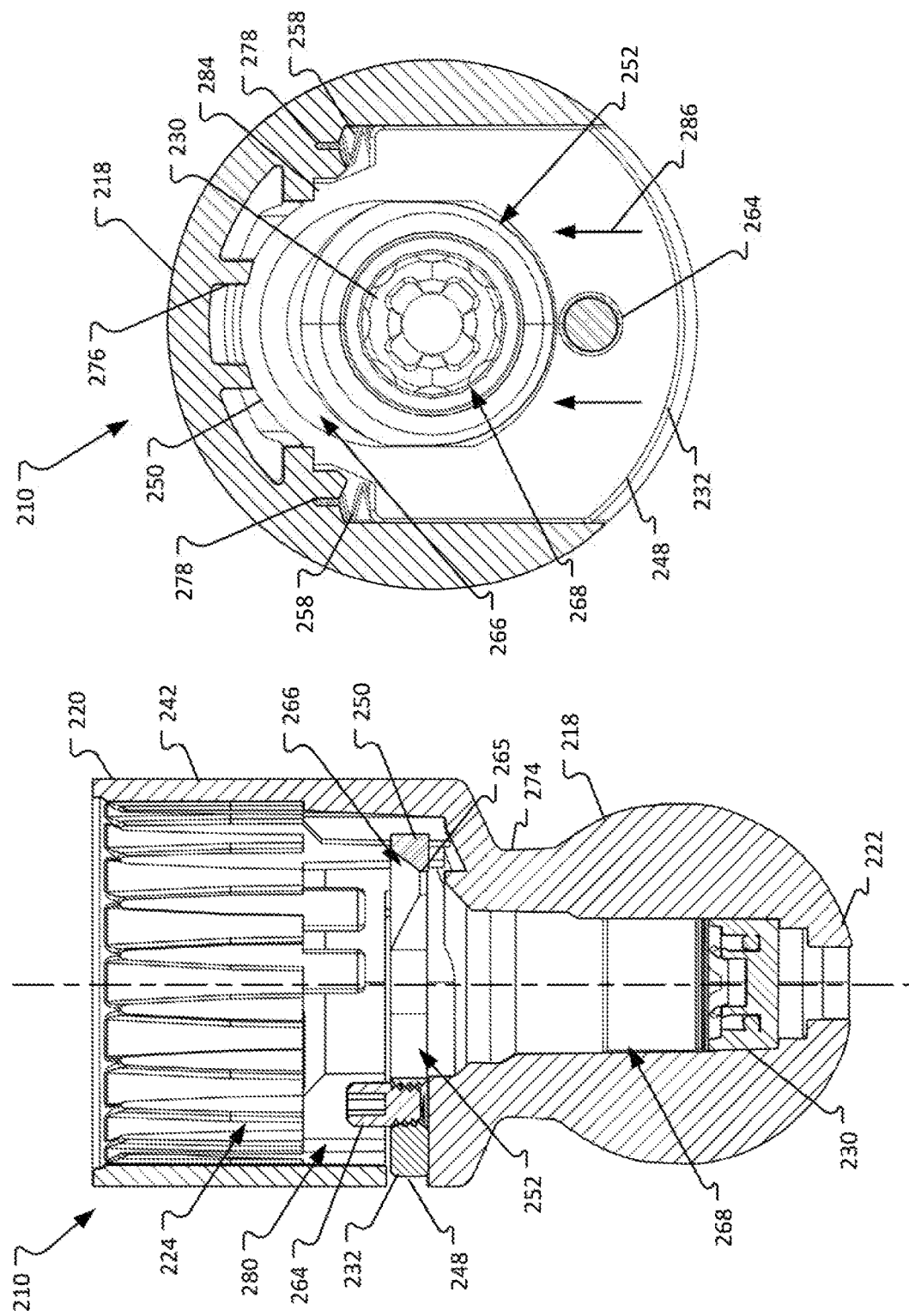

QUICK CONNECT SHOWER HEAD

CROSS-REFERENCE TO RELATED APPLICATIONS

This application claims priority to and the benefit of Chinese Patent Application No. 202210236343.2, filed Mar. 11, 2022, and U.S. Provisional Patent Application No. 63/163,354, filed Mar. 19, 2021, the disclosures of which are incorporated by reference herein in their entireties. To the extent appropriate a claim for priority is made to each of the above referenced applications.

BACKGROUND

When considering a shower head or water dispensing mechanism, installation is an important consideration. Typical showerheads are cumbersome and can be difficult to maneuver and attach to a water outlet such as a shower arm. Additionally, a wrench or other gripping tool is typically required to grip directly to the shower head as the shower head is installed. Wrenches can cause marring or other cosmetic issues which are not desirable during installation. For these reasons, improvements are desired.

SUMMARY

The present disclosure relates generally to water dispensing systems and showerhead assemblies. In an aspect, the technology relates to a showerhead assembly including: a male adapter having a first end and a second end, the first end having interior threading for connection to a supply pipe and at least one lug on an exterior surface, the second end having a fluid aperture at a chamfered end, at least one outer circumferential seal, and an outer circumferential shoulder positioned towards the first end from the at least one outer circumferential seal; and a showerhead having a female adapter releasably engageable to the male adapter, the female including: a longitudinal channel sized to receive at least a portion of the second end of the male adapter and form a fluid seal against the at least one outer circumferential seal; a retention clip movable between a release position and a retention position, the retention clip being spring-biased toward the retention position and having a retention edge positioned at least partially within the longitudinal channel when in the retention position, the retention edge engaging with the outer circumferential shoulder of the male adapter to maintain a relative axial positioning of the male adapter and the female adapter; and a sleeve positioned over the first end and at least a portion of the second end of the male adapter when engaged to the male adapter, the sleeve having at least one interior axial channel engaging with the at least one lug on the exterior surface of the first end of the male adapter to limit rotational movement of the female adapter relative to the male adapter.

In some examples, the female adapter has a first end including the sleeve and an opposite second end, the second end of the female adapter having a ball shape such that a ball joint connection is formed between the female adapter and the showerhead.

In some examples, the retention edge of the retention clip is fully disposed within the female adapter in both the release position and the retention position.

In some examples, the retention clip defines an opening configured to receive the second end of the male adapter, the retention edge at least partially defining the opening.

In some examples, a flow regulator disposed within the female adapter.

In some examples, the retention clip has a first end and an opposite second end, the first end of the retention clip includes a stop pin extending therefrom and the second end of the retention clip includes the retention edge, the stop pin captured at least partially by the sleeve to retain the retention clip within the sleeve.

In some examples, the stop pin is configured to prevent removal of the retention clip from the female adapter when the male adapter is not attached.

In some examples, the female adapter includes a pair of biasing springs disposed on both sides of the retention clip proximate the retention edge.

In some examples, the sleeve defines a pair of spring pockets to at least partially receive a first end of the pair of biasing springs.

In some examples, a pair of spring seats are defined on both sides of the retention clip proximate the retention edge, the pair of spring seats at least partially receive a second end of the pair of biasing springs.

In some examples, the pair of biasing springs are disposed on the same plane with the retention clip.

In some examples, the retention clip includes a button extending from the retention clip opposite the retention edge.

In some examples, the female adapter includes a biasing spring extending between the button and the sleeve.

In some examples, at least one notch is defined on opposing sides of the retention clip and configured to engage the sleeve to retain the retention clip within the sleeve.

In another aspect the technology relates to a water dispensing system including: a first coupling element including: a first end having an exterior wall defining an interior chamber, wherein a slot is defined in the exterior wall; an opposite second end configured to attach to a first water dispensing component, wherein the first end and the second end define a longitudinal axis; a locking slide disposed at least partially within the interior chamber, the locking slide translatable between at least a first position and a second position in a direction that is orthogonal to the longitudinal axis, the locking slide having a first end extending through the slot of the exterior wall and an opposite second end disposed completely within the interior chamber, the second end of the locking slide defining an opening; and at least one biasing spring biasing the locking slide towards the first position; and a second coupling element including: a first end configured to attach to a second water dispensing component; an opposite second end having an outer chamfered edge; and an outer circumferential shoulder disposed between the first end and the second end of the second coupling element, wherein the interior chamber of the first coupling element is configured to receive at least a portion of the second end of the second coupling element to releasably couple the first water dispensing component in fluid communication with the second water dispensing component, and wherein during insertion of the second end of the second coupling element into the interior chamber, the second end of the second coupling element inserts into the opening of the locking slide such that the locking slide engages with the outer circumferential shoulder in the first position, and the locking slide is configured to be manually depressed to move the locking side towards the second position and release engagement with the outer circumferential shoulder.

In some examples, the second end of the first coupling element is a ball shape such that a ball joint connection is formed between the first coupling element and the first water dispensing component.

In some examples, the first water dispensing component is a shower head.

In some examples, when the first coupling element is attached to the second coupling element, rotation of at least a portion, or all, of the first water dispensing component around the longitudinal axis is prevented.

In some examples, the exterior wall of the first coupling element has an inner surface having one or more axial channels, and the first end of the second coupling element has an exterior surface having one or more corresponding lugs, the one or more lugs configured to engage with the one or more axial channels when the first coupling element is attached to the second coupling element to restrict rotation around the longitudinal axis.

In some examples, a flow regulator is disposed within the second end of the first coupling element.

In some examples, the first end of the locking slide includes a stop pin extending parallel to the longitudinal axis, the stop pin captured at least partially by the exterior wall to retain the locking slide within the interior chamber.

In some examples, the stop pin is configured to prevent removal of the locking slide from the slot when the second coupling element is not attached.

In some examples, the stop pin is accessible from within the interior chamber.

In some examples, the at least one biasing spring includes a pair of biasing springs disposed on both sides of the locking slide adjacent the opening.

In some examples, the exterior wall defines a pair of spring pockets within the interior chamber to at least partially receive a first end of the pair of biasing springs.

In some examples, a pair of spring seats are defined on both sides of the locking slide adjacent the opening, the pair of spring seats at least partially receive a second end of the pair of biasing springs.

In some examples, the pair of biasing springs are disposed on the same plane with the locking slide.

In some examples, the locking slide includes a button extending from the first end of the locking slide.

In some examples, the at least one biasing spring extends between the button and the exterior wall.

In some examples, at least one notch is defined on opposing sides of the locking slide and configured to engage the exterior wall to retain the locking slide within the interior chamber.

In some examples, the at least one notch is configured to prevent removal of the locking slide from the slot when the second coupling element is not attached.

In another aspect, the technology relates to a water dispensing system including a first element. The first element includes a first coupling element attached to an end. The first coupling element has a male coupling portion that has a water outlet and a securing portion that is positioned axially adjacent the male coupling portion. The securing portion has an axial length. The second element is mated to the first element. The second element includes a second coupling element attached to an end. The second coupling element has a female coupling portion that has a recess defined by a housing and a connector positioned within the recess, the connector of the female coupling portion being positioned within the water outlet of the first coupling element. The securing portion of the first coupling element is positioned within the recess of the second coupling element, and the housing of the second coupling element radially overlaps a majority of the axial length of the securing portion.

In some examples, the housing of the second coupling element radially overlaps the entire axial length of the securing portion.

In some examples, at least one of the first or second elements include at least one nozzle configured to dispense water therefrom.

In some examples, at least one of the first or second elements is a showerhead.

In some examples, at least one of the first or second elements is a shower arm.

In some examples, the connector of the second coupling element includes an O-ring positioned therearound, the O-ring forming a seal against an interior surface of the water outlet.

In some examples, the male coupling portion includes a flange mated with inwardly biased wings of the female coupling, wherein the wings prohibit relative axial movement in a direction toward the securing portion of the first coupling element.

In some examples, the second coupling element includes a movable control operably connected with the inwardly biased wings, the control being configured to move the inwardly biased wings away from the male coupling upon actuation of the control.

In some examples, the movable control is at least one button. In other examples, there are two buttons.

In some examples, the securing portion has a second transverse width, wherein the second transverse width of the securing portion is greater than the first transverse width of the male coupling.

In another aspect, the technology relates to a shower head include: a coupling element at a first end of the shower head, the coupling element including: a female coupling element having: a longitudinal axis; a recess defined by a housing; a connector positioned within the recess and aligned coaxially with the longitudinal axis, the connector being configured to fit within a water outlet of a shower arm, at least one inwardly biased wing positioned adjacent to the longitudinal axis, the at least one inwardly biased wing being configured to be positioned around a male coupling element in order to prevent relative axial movement between the male coupling element and the female coupling element; and a movable control operably connected to the at least one inwardly biased wing, wherein the control is configured to move the at least one inwardly biased wing away from the longitudinal axis; a dispensing head at an opposite second end of the shower head, the dispensing head including at least one opening configured to allow water to flow therefrom; and a central fluid path extending between the first end and the second end, the central fluid path allowing for fluid to flow from the water outlet through the at least one opening of the dispensing head.

In some examples, the connector of the female coupling element includes an O-ring positioned therearound.

In some examples, the movable control is at least one button.

In some examples, the movable control is two buttons.

In some examples, the movable control is a lever.

In some examples, the coupling element extends into the dispensing head and a portion of the dispensing head is configured to mate with the coupling element, and wherein the portion of the dispensing head that mates with the coupling is a ball and is configured to allow the dispensing head to pivotally move relative to the longitudinal axis.

In some examples, the shower head is part of a water dispensing system, wherein the water dispensing system includes a male coupling element configured to mate with the female coupling element, the male coupling element including a flange, wherein the at least one inwardly biased wing of the female coupling element is positioned above the flange of the male coupling element when the male and female coupling elements are mated together, and wherein the at least one inwardly biased wing prohibits relative axial movement between the male and female coupling elements.

In some examples, the male coupling element has a first transverse width, and wherein the flange has a second transverse width, wherein the second transverse width is greater than the first transverse width.

In some examples, the male coupling element is part of a second coupling element, the male coupling element having the water outlet and a securing portion positioned axially adjacent the male coupling element, the securing portion having an axial length, wherein the securing portion includes threads which are threaded onto the shower arm.

In some examples, a housing of the female coupling element is configured to extend over a majority of the axial length of the securing portion.

In some examples, the housing of the female couple element is configured to extend over the entire axial length of the securing portion of the second coupling element.

In some examples, first and second inwardly biasing wings are included, wherein the inwardly biasing wings actuate between a first position and a second position, and wherein the first position has a first width which is less than a width of a male coupling element and the second position is greater than the width of the male coupling element.

In some examples, the first and second inwardly biased wings actuate between the first and the second positions when the movable control is depressed and when the female coupling element is attached to the male coupling element.

In another aspect, the technology relates to a method of installing a shower head including: providing a first coupling element having: a female coupling portion having a recess defined by a housing and a connector positioned within the recess; providing a second coupling element having: a male coupling portion having a water outlet; a securing portion positioned axially adjacent the male coupling portion, the securing portion having an axial length; positioning the connector of the female coupling portion of the first coupling element within the water outlet of the male coupling portion of the second coupling element; and radially overlapping a majority of the axial length of the securing portion of the second coupling with the recess of the female coupling portion of the first coupling element.

In some examples, the second coupling element is attached to a shower arm and the first coupling element is attached to a shower head.

In some examples, the method includes attaching the second coupling element to the shower arm prior to positioning the connector of the female coupling portion of the second coupling element within the water outlet of the male coupling portion of the first coupling element.

In some examples, the securing portion of the second coupling element includes a threaded interior allowing the second coupling element to be threaded to the shower arm.

In some examples, the female coupling portion includes at least one inwardly biased wing, the at least one inwardly biased wing being configured to mate with an exterior flange of the male coupling portion.

In some examples, the first coupling element includes a movable control operably connected with at least one inwardly biased wing, wherein the movable control is configured to move at least one inwardly biased wing away from the male coupling portion upon actuation of the movable control.

In some examples, the movable control is at least one button. In other examples, the movable control is a rotatable ring A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

FIG. 18 is a partial cross-sectional view of the first coupling element of FIG. 17 with a locking slide in a first position.

FIG. 19 is another cross-sectional view of the first coupling element of FIG. 17 with the locking slide in the first position.

FIG. 20 is a cross-sectional view of the first coupling element of FIG. 17 with a locking slide in a second position.

FIG. 21 is another cross-sectional view of the first coupling element of FIG. 17 with the locking slide in the second position.

Figure 1:
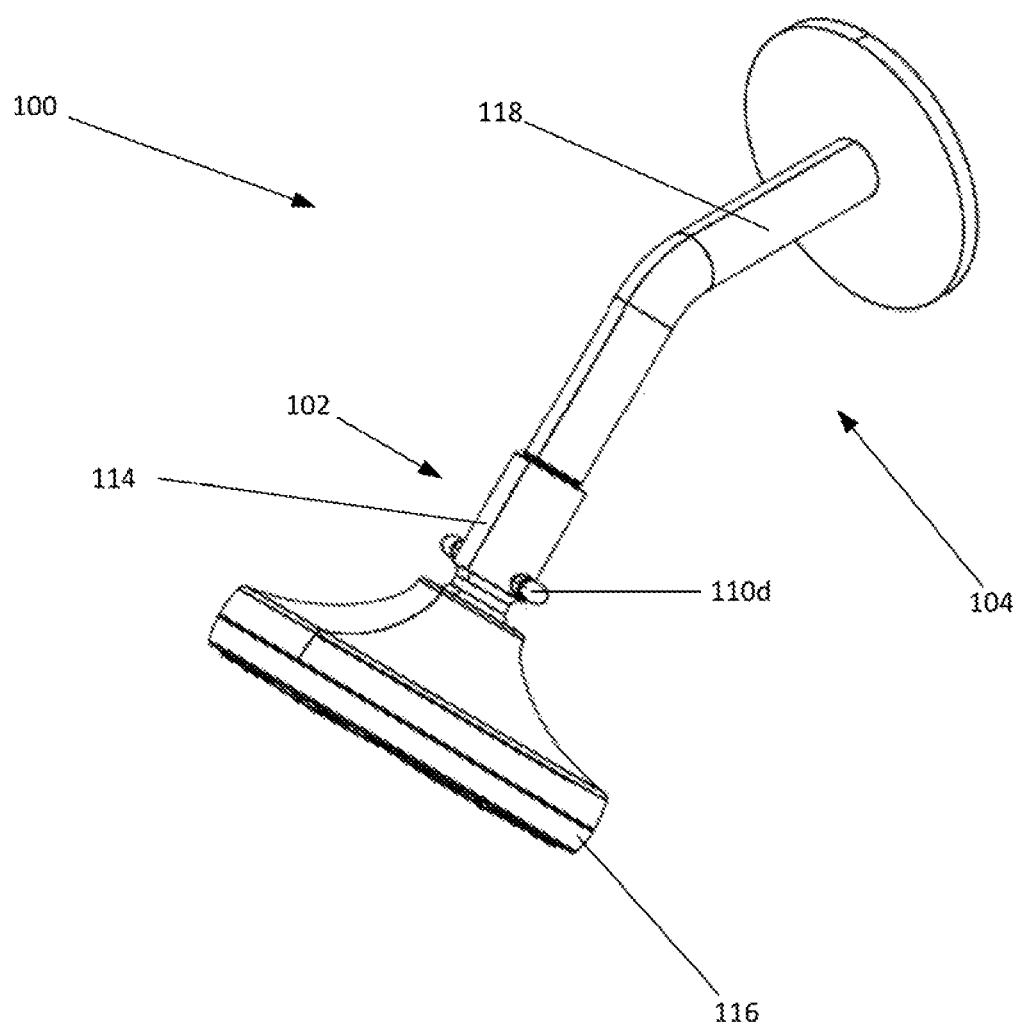
FIG. 1 is a front perspective view of a water dispensing system in accordance with the principles of the present disclosure.

The exemplifications set out herein illustrate embodiments of the invention, and such exemplifications are not to be construed as limiting the scope of the invention in any manner.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims. It is appreciated that features of some examples may be combined with or removed from features in other examples.

The water dispensing system disclosed herein includes a plurality of advantages. The example of the water dispensing system is shown as a showerhead. This disclosure provides a quick method to install a shower head or other water dispensing system to a water outlet. Additionally, the shower head of the present disclosure presents a solution to marring issues from using a wrench or other gripping tool during installation.

The shower head disclosed herein is configured to attach to a shower arm. However, it is considered within the scope of the present disclosure that other water dispensing mechanisms can be attached to other water outlets in a similar manner using the principles of the present disclosure.

Many components of the water dispensing system may be referred to as having generally cylindrically, circular, annular, or conical features, and as having cylindrical or circular holes, cavities, and openings. Such features may be referred to, or defined by, a circumference, radius, external surface, internal surface, and/or other terms appropriate for defining such features. It should be noted that such features may alternatively be elliptical, polygonal, and the like. As used herein, the terms "axial" and "longitudinal" refer to directions and orientations, which extend substantially parallel to a centerline of the water dispensing system. Moreover, the terms "radial" and "radially" refer to directions and orientations, which extend substantially perpendicular to the centerline of the water dispensing system. In addition, as used herein, the terms "circumferential" and "circumferentially" refer to directions and orientations, which extend arcuately about the centerline of the water dispensing system.

In addition, one having skill in the art will understand the degree to which terms such as "about," "approximately," or "substantially" convey in light of the measurements techniques utilized herein. To the extent such terms may not be clearly defined or understood by one having skill in the art, the term "about," "approximately," or "substantially" shall mean plus or minus ten percent.

Figure 2:
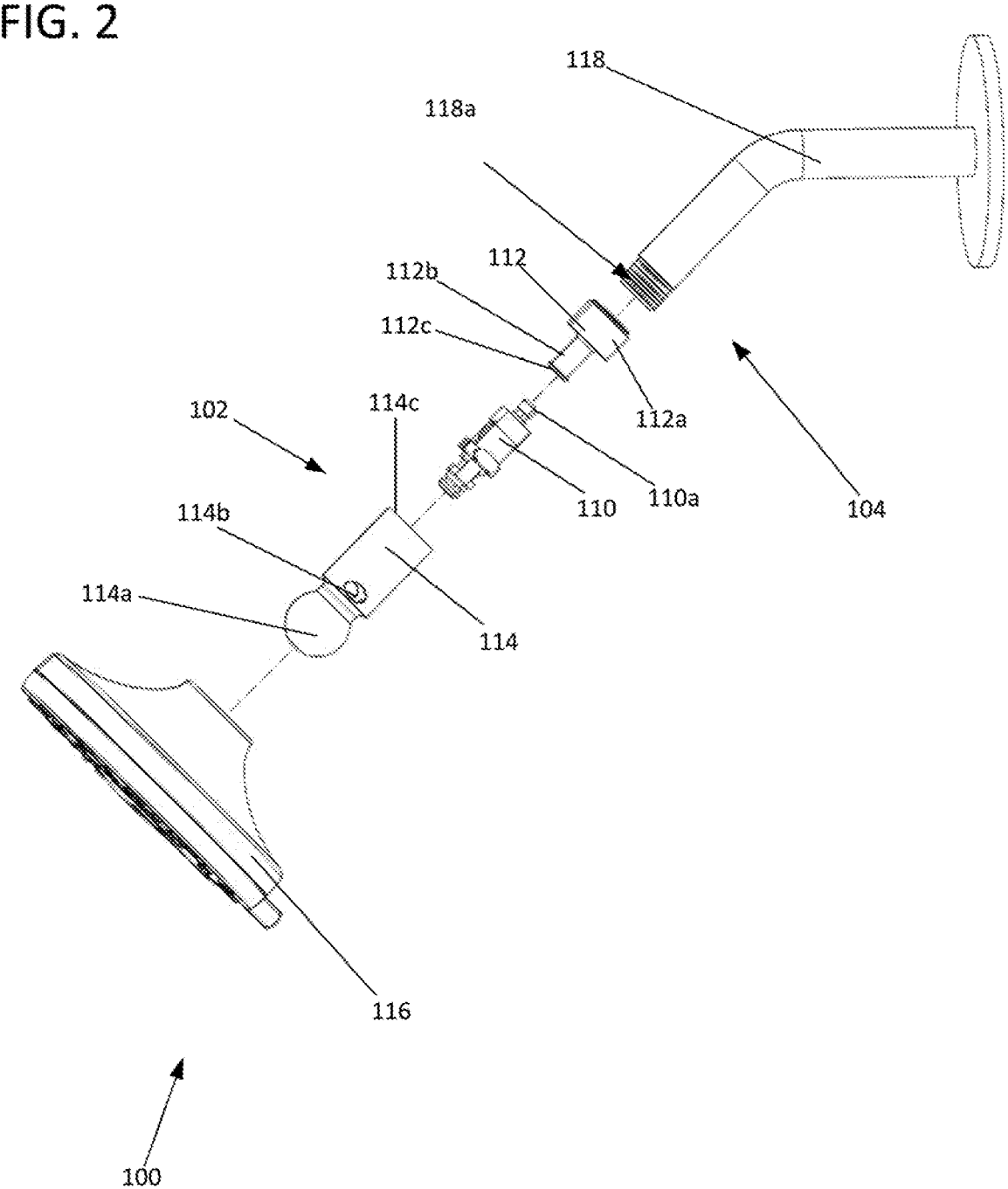
FIG. 2 is an exploded view of the water dispensing system of FIG. 1.

FIG. 1 shows a perspective view of a water dispensing system 100 featuring a shower head assembly 102 mounted to a shower arm assembly 104. As can be seen at the exploded view in FIG. 2, the shower head assembly 102 includes a housing 114, a first coupling element 110, and a water dispersing mechanism 116. The shower arm assembly 104 includes a shower arm 118 and a second coupling element 112. The second coupling element 112 has an outlet 112c.

In some examples, the first and second coupling elements 110, 112 form a quick connect coupling to toollessly attach the shower head assembly 102 to the shower arm assembly 104. In the example shown, the first coupling element 110 is a female coupling element and the second coupling element 112 is a male coupling element; however, it is within the scope of this disclosure that the first coupling element 110 can be a male coupling element and the second coupling element 112 can be a female coupling element.

The first coupling element 110 includes a connector 110a that is configured to extend into the outlet 112c of the second coupling element 112 when the shower head assembly 102 is mounted to the shower arm assembly 104.

The second coupling element 112 includes a securing portion 112a axially adjacent a male coupling portion 112b. The male coupling portion 112b is configured to secure the second coupling element 112 to the shower arm 118 and the securing portion 112a is configured to be threaded onto a threaded portion 118a of the shower arm 118.

The housing 114 is configured to receive and mount the first coupling element 110 therein. In some examples, when the first coupling element 110 is mounted to the second coupling element 112, the housing 114 is configured to overlap the second coupling element 112. In such an example, the housing 114 covers the second coupling element 112, specifically the securing portion 112a, which often includes marring thereon from installing the second coupling element 112 onto the threaded portion 118a of the shower arm 118.

The housing 114 includes a ball shape 114a at a first end and a recess 114c at a second, opposite end. The ball shape 114a extends into the water dispersing mechanism 116 forming a ball joint, thereby allowing a user to adjust the water dispersing mechanism 116 to various angles. The housing 114 additionally includes apertures 114b which allow for a control 110d (shown in FIG. 1) to extend from the first coupling element 110 through the housing 114.

Figure 3:
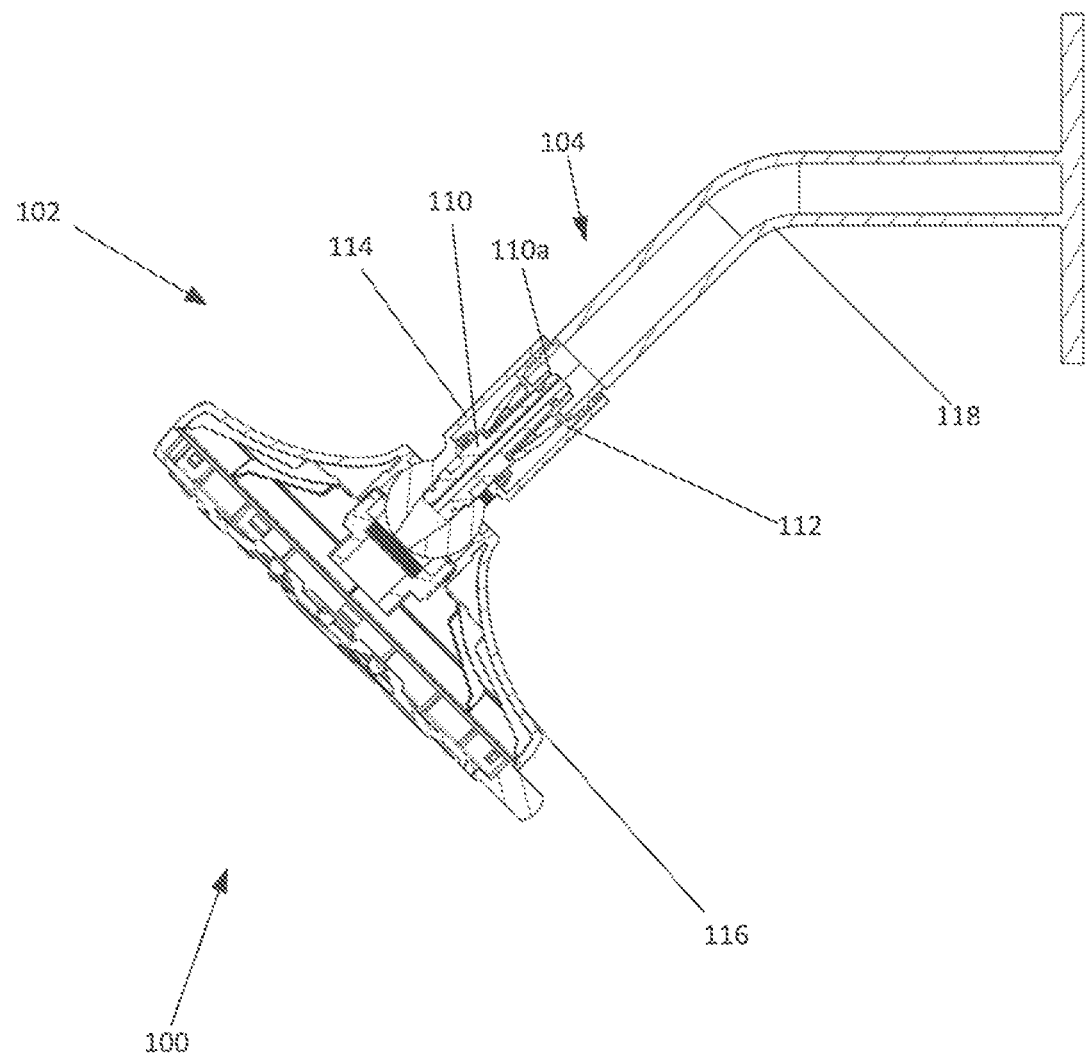
FIG. 3 is a cross-sectional view of the water dispensing system of FIG. 1.
Figure 4:
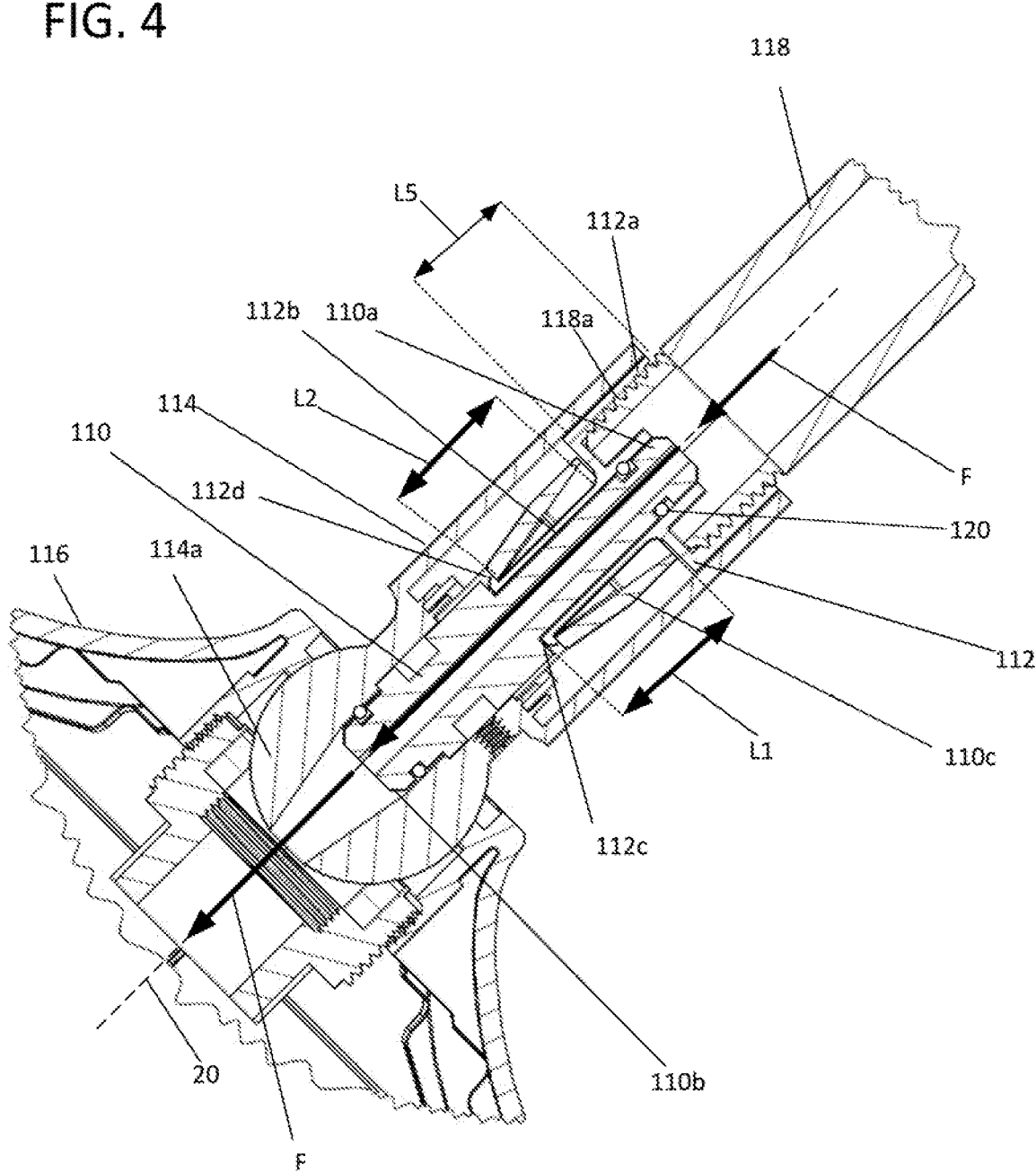
FIG. 4 is a zoomed in view of FIG. 3.

FIGS. 3 and 4 show a cross-sectional view and a zoomed in cross-sectional view of the shower head assembly 102 in connection with the shower arm assembly 104, respectively. FIG. 4 highlights the connection between the first coupling element 110 and the second coupling element 112. A fluid path F flows from the shower arm 118 and extends through the second coupling element 112 and through the outlet 112c. Fluid then passes through the connector 110a of the first coupling element 110 and out of an outlet 110b, then finally through the water dispersing mechanism 116 along a longitudinal axis 20.

Figure 12:
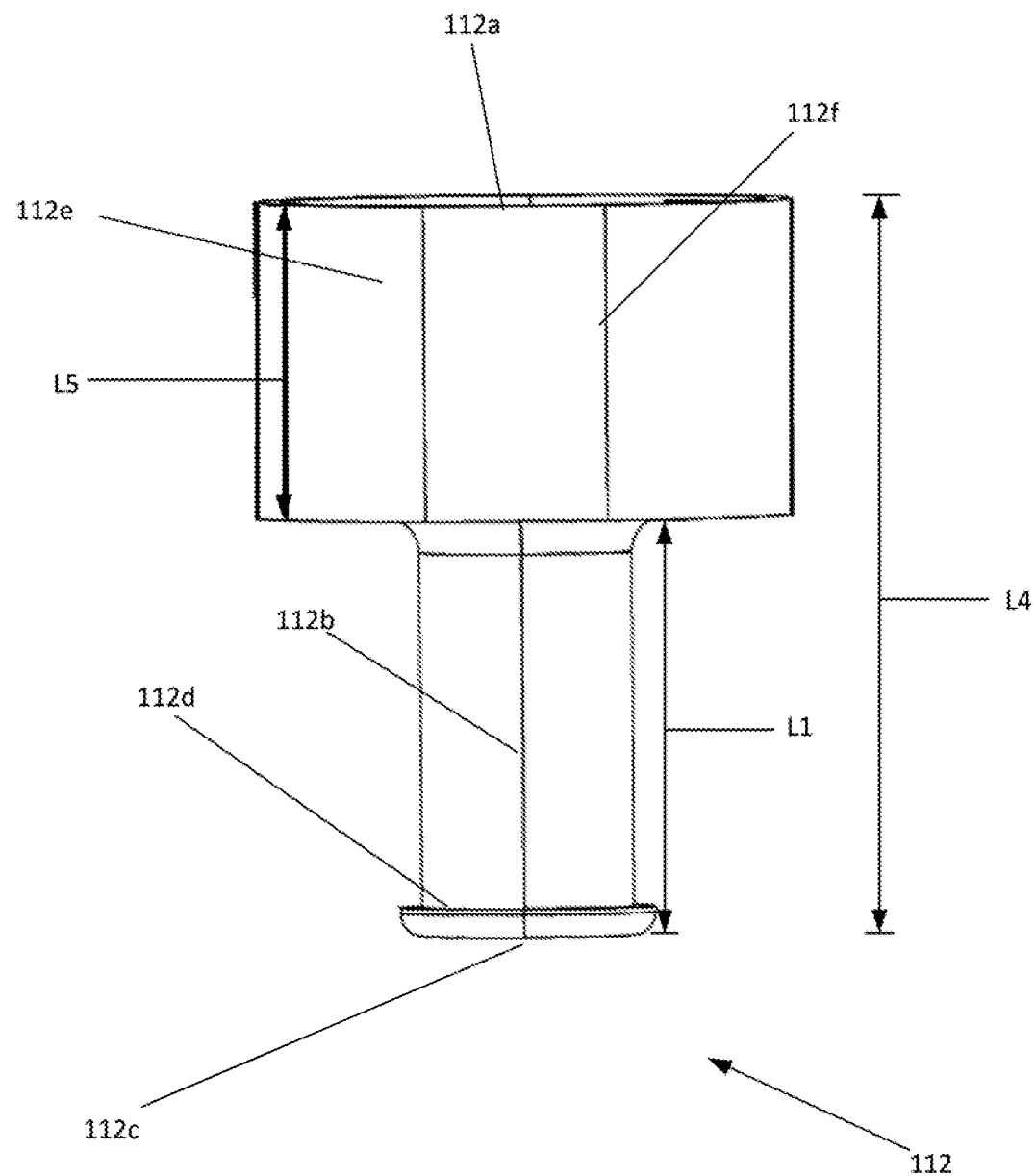
FIG. 12 is a front view of the second coupling element of FIG. 5 in isolation.

The second coupling element 112 includes the male coupling portion 112b which extends along a length L1 and the securing portion 112a which extends along a length L5 (also shown in FIG. 12). The male coupling portion 112b includes a flange 112d. The first coupling element 110 includes inwardly biased wings 110c. When the first and second coupling elements 110, 112 are mated with one another, the connector 110a of the first coupling element 110 is positioned within the outlet 112c of the second coupling element 112. To provide a seal between the first coupling element 110 and the second coupling element 112, the connector 110a of the first coupling element 110 includes an O-ring 120. As can be seen, a length L2 of the inwardly biased wings 110c overlaps the length L1 of the male coupling portion 112b. Further, when mated, the inwardly biased wings 110c of the first coupling element 110 are positioned around the male coupling portion 112b of the second coupling element 112. The inwardly biased wings 110c, are positioned above the flange 112d and rest along the length L1 of the male coupling portion 112b. The positioning of the inwardly biased wings 110c above the flange 112d prevents relative axial movement between the first coupling element 110 and the second coupling element 112.

Figure 5:
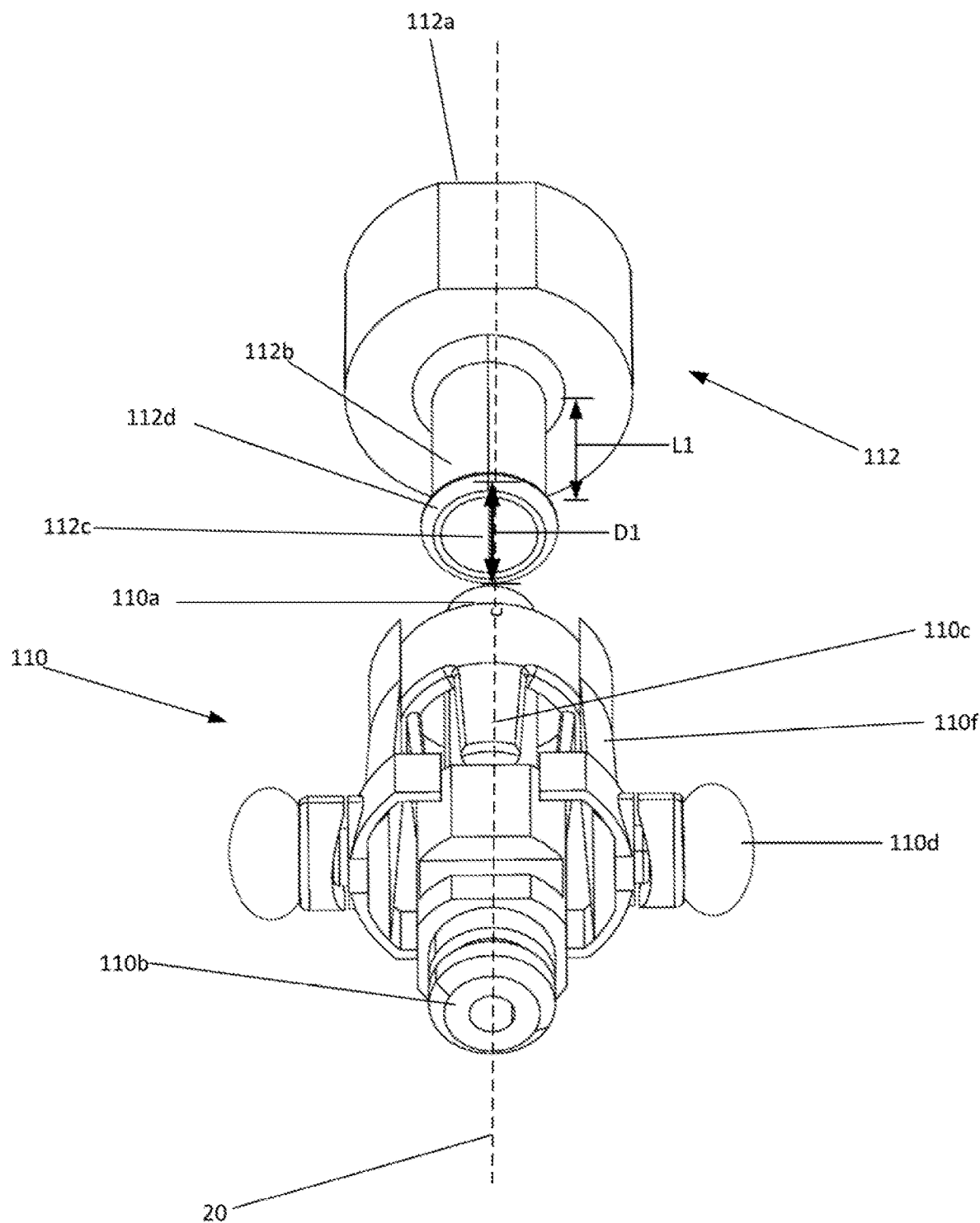
FIG. 5 is a perspective view of a first coupling element and a second coupling element of the water dispensing system of FIG. 1 prior to coupling with one another.
Figure 6:
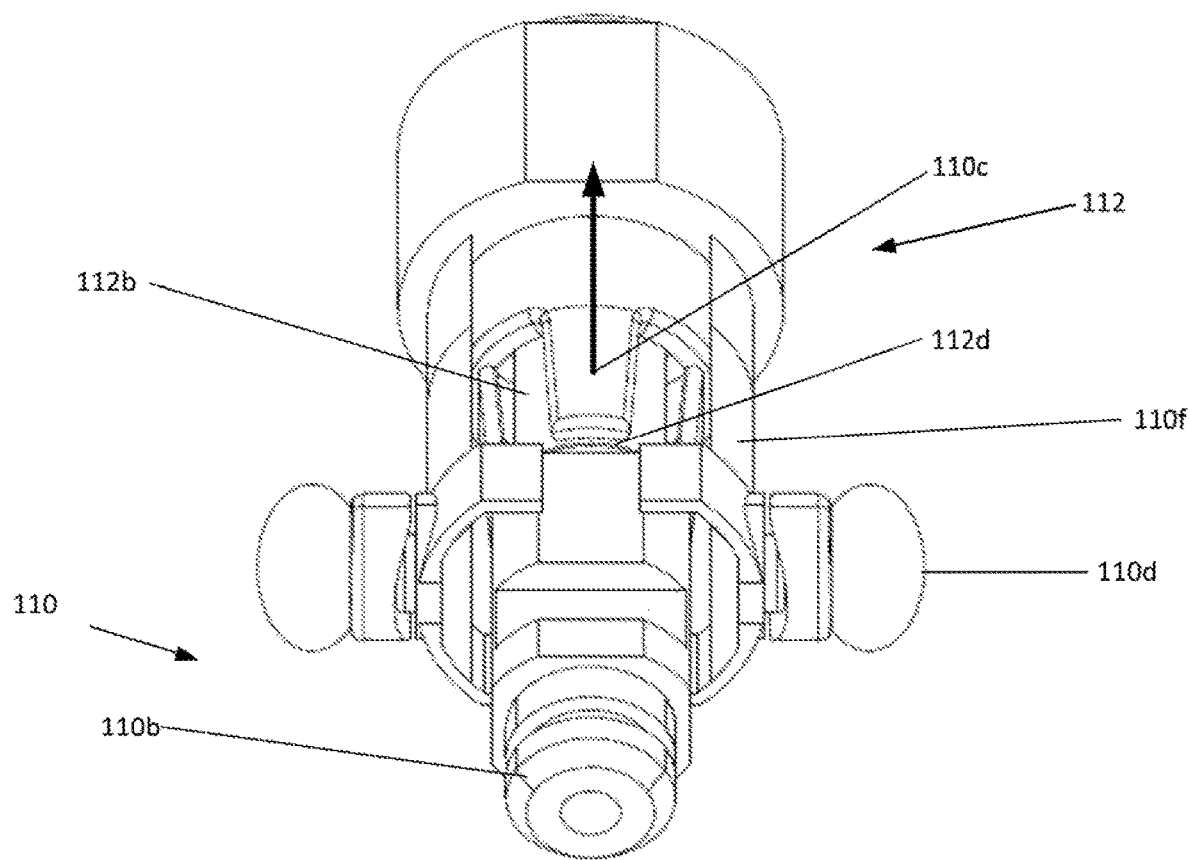
FIG. 6 is a perspective view of the first and second coupling elements of FIG. 5 as they are being coupled with one another.
Figure 7:
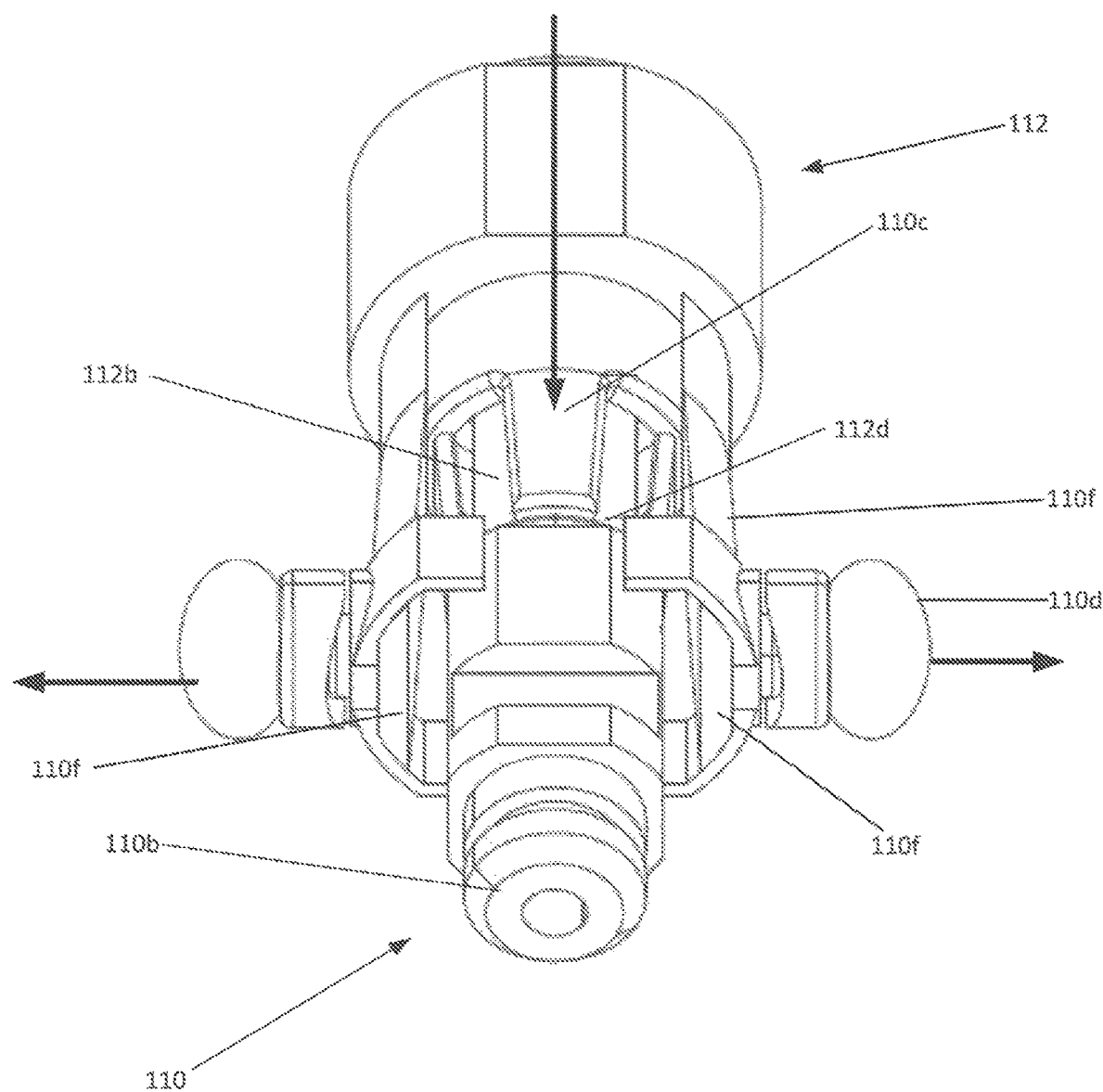
FIG. 7 is a perspective view of the first and second coupling elements of FIG. 5 after they have been coupled with one another.
Figure 8:
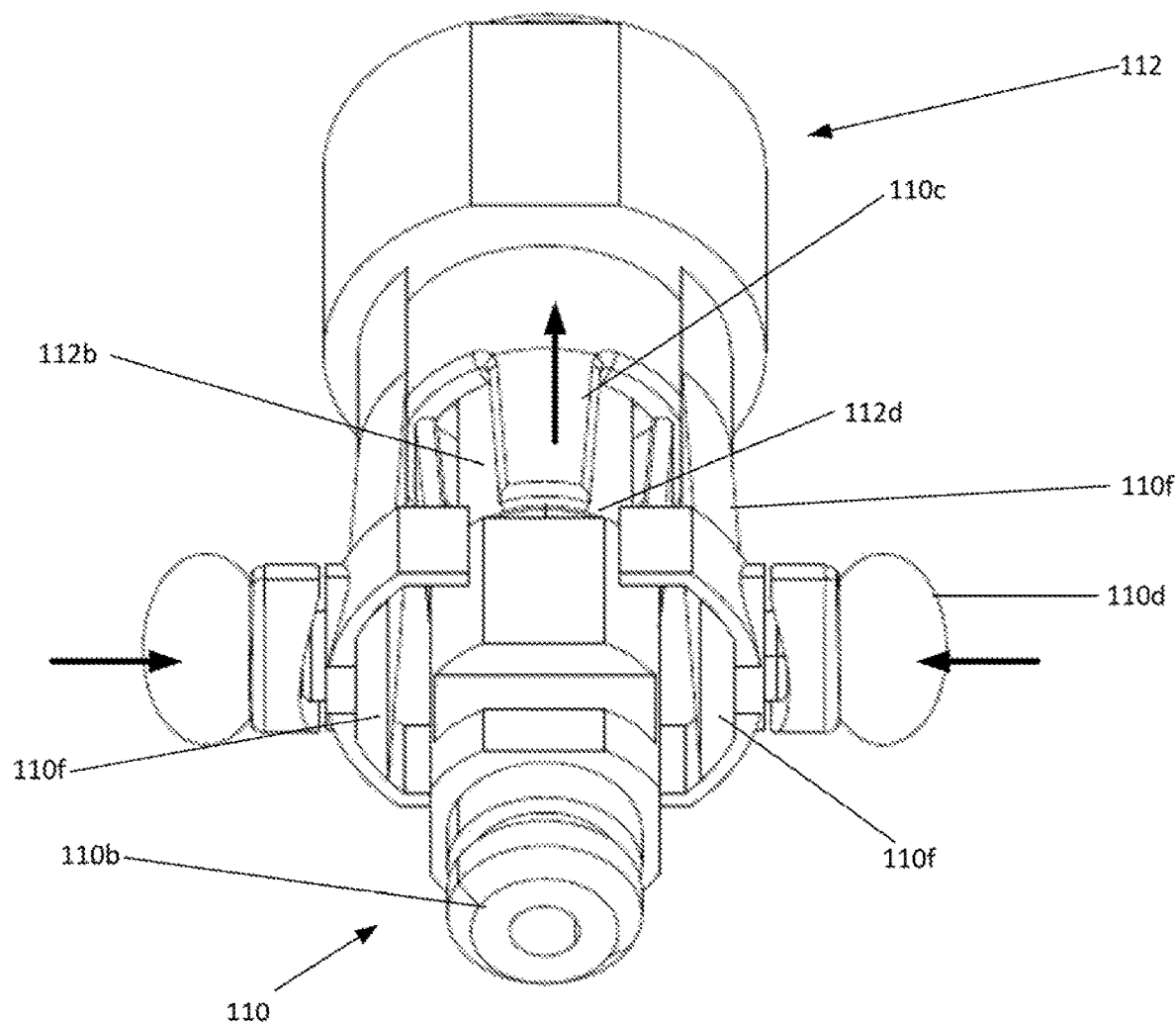
FIG. 8 is a perspective view of the first and second coupling elements of FIG. 5 as they decouple from one another.

FIGS. 5-7 show the first and second coupling elements 110, 112 as they couple together. FIG. 8 shows the first and second coupling elements 110, 112 as they decouple from one another.

Referring to FIG. 5, the first coupling element 110 and the second coupling element 112 are shown prior to being coupled with one another. The inwardly biased wings 110c are shown biased toward the connector 110a and toward a longitudinal axis 20. The connector 110a of the first coupling element 110 is shown aligned with the outlet 112c of the second coupling element 112. The control 110d is shown operably connected to outwardly biased wings 110f.

The flange 112d of the second coupling element 112 is shown shaped as a ring about the outlet 112c. The flange 112d has a diameter D1 which is wider than the rest of the male coupling portion 112b of the second coupling element 112.

As can be seen in FIG. 6, when the first and second coupling elements 110, 112 are being coupled to one another, the flange 112d of the second coupling element 112 is pushed into the second coupling element 112. As the flange 112d is pushed through the inwardly biased wings 110c, the inwardly biased wings 110c deflect away from the connector 110a (shown in FIG. 5), as indicated by the arrow extending from inwardly biased wings 110c, thereby allowing the flange 112d to pass through the inwardly biased wings 110c.

FIG. 7 shows the first and second coupling elements 110, 112 coupled to one another. As the flange 112d axially passes the inwardly biased wings 110c within the first coupling element 110 as it is inserted into the first coupling element 110, the inwardly biased wings 110c move toward the connector 110a (shown in FIG. 5), as indicated by the arrow pointing toward the inwardly biased wings 110c. Once moved toward the connector 110a, the inwardly biased wings interface with the male coupling portion 112b of the second coupling element 112 and come to rest behind the flange 112d. Because the inwardly biased wings 110c extend to the male coupling portion 112b, and the flange 112d has a dimeter larger than the male coupling portion 112b, the second coupling element 112 is prevented from moving axially relative to the first coupling element 110 in the direction in which the second coupling element 112 was inserted into the first coupling element 110. Specifically, the flange 112d of the male coupling portion 112b contacts the inwardly biased wings 110c of the first coupling element 110 to prevent relative movement. In some examples, inward movement of the inwardly biased wings 110c cause outward movement, away from the connector 110a, of the outwardly biased wings 110f. This movement of the outwardly biased wings 110f causes the control 110d to also move outward, as indicated by the outwardly extending arrows from the outwardly biased wings 110f.

FIG. 8 shows the movement of the first and second coupling elements 110, 112 when removing the male coupling portion 112b of the second coupling element 112 from the first coupling element 110. When the controls 110d are compressed, as indicated by the inward arrows, the outwardly biased wings 110f deflect towards the connector 110a (shown in FIG. 5). This causes the inwardly biased wings 110c to deflect away from the connector 110a, as indicated by an arrow. The outward movement of the inwardly biased wings 110c allows a user to remove the first coupling element 110 from the second coupling element 112.

Figure 9:
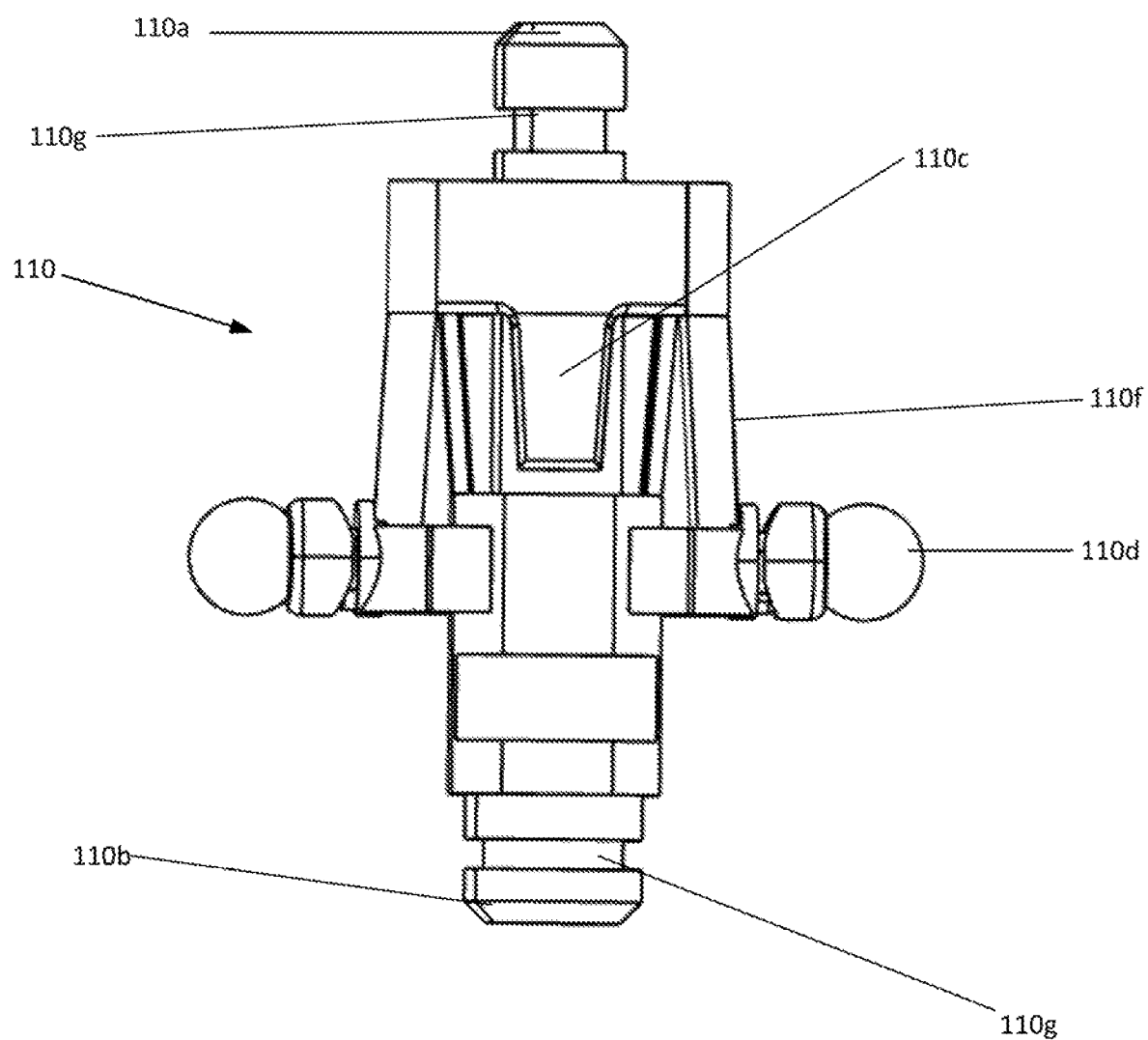
FIG. 9 is a front view of the first coupling element of FIG. 5 in isolation.
Figure 10:
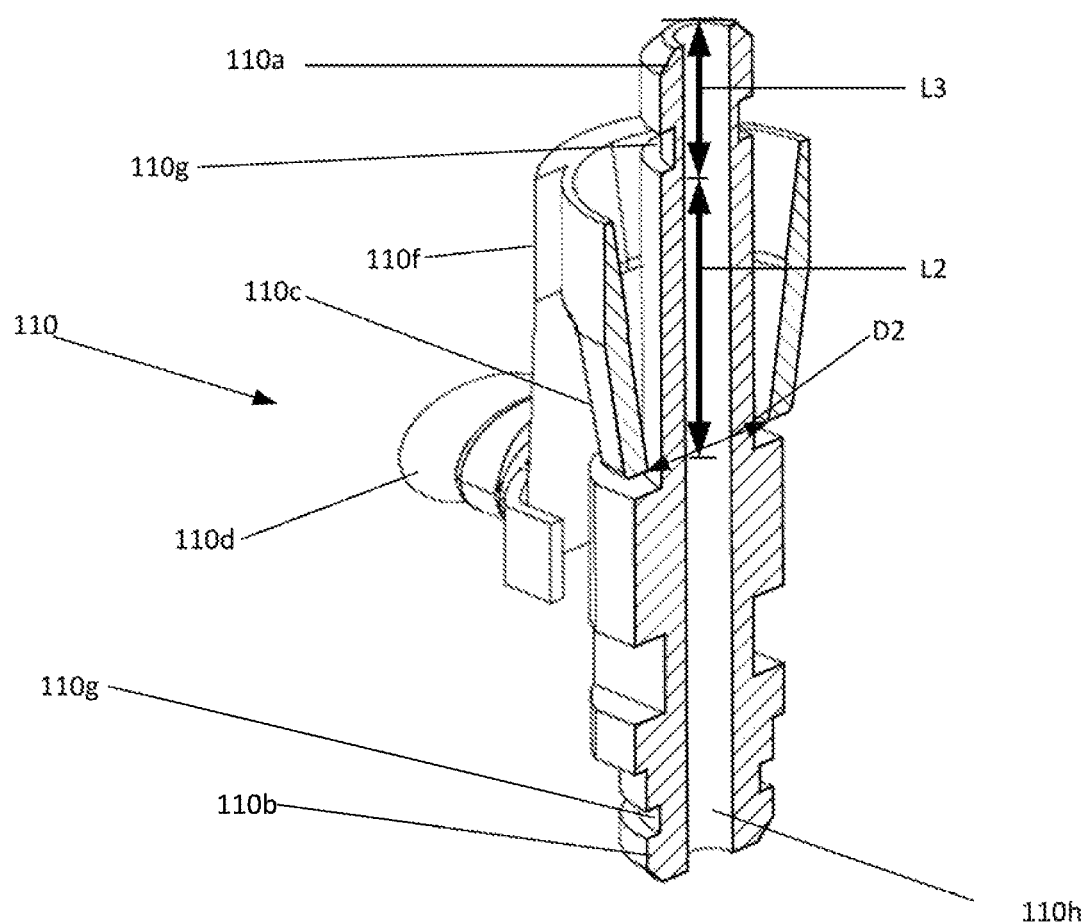
FIG. 10 is a perspective, cross-sectional view of the first coupling element of FIG. 5 in isolation.
Figure 11:
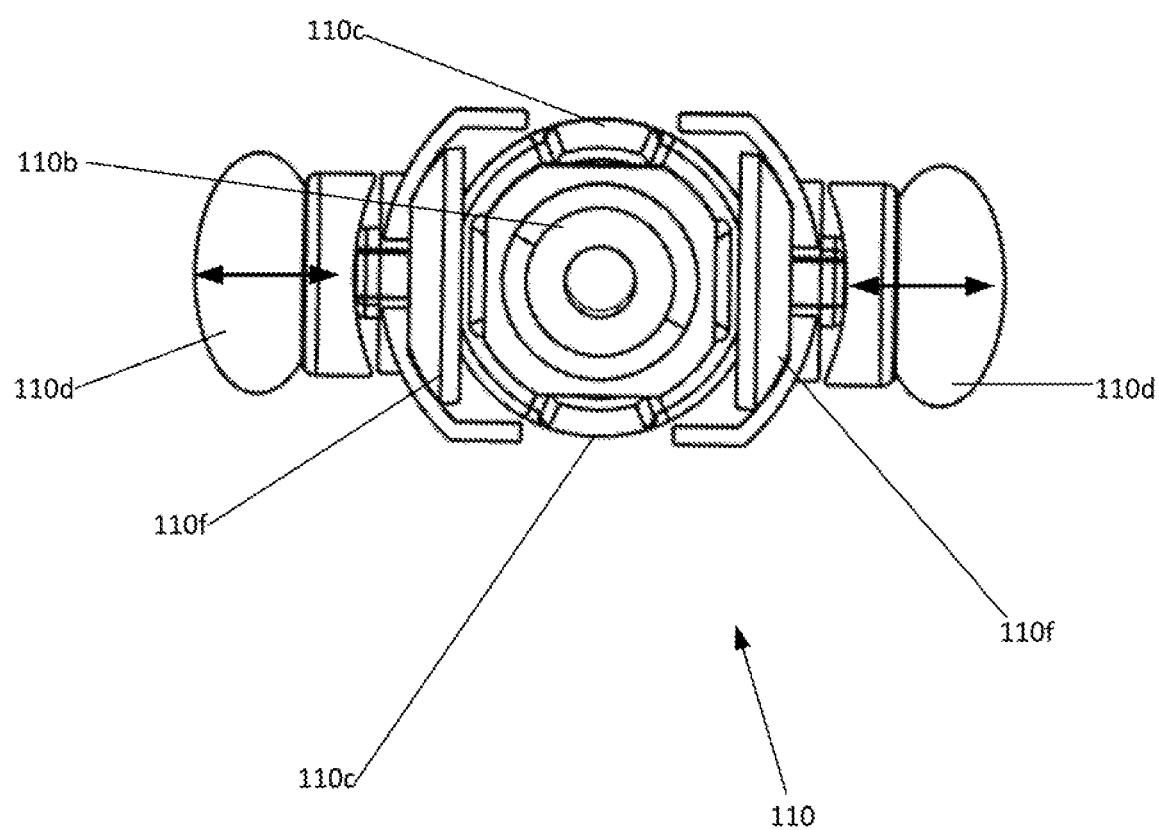
FIG. 11 is a bottom view of the first coupling element of FIG. 5 in isolation.

FIGS. 9-11 show the first coupling element 110 in isolation. The control 110d is shown as a button and operably connected to the outwardly biased wings 110f. However, the control 110d could be a variety of different elements that provide a similar function (e.g., deflecting the outwardly biased wings 110f inward).

The first coupling element 110 includes indented channels 110g which are near the connector 110a and the outlet 110b. The indented channels 110g provide a space in which the O-ring 120 can be positioned.

FIG. 10 shows a perspective, longitudinal cross-section of the first coupling element 110. The first coupling element 110 includes a longitudinal fluid channel 110h which defines the fluid path F (shown in FIG. 4). Further, the inwardly biased wings 110c of the first coupling element 110 are positioned such that they have a width D2 when at rest. In some examples, the width D2 is less than diameter D1 of the flange 112d of the second coupling element 112 (shown in FIG. 5). In some examples, the first coupling element 110 is typically made of a polymeric material with sufficient flexibility to allow the inwardly biased wings 110c to deflect from the initial width D2 to at least the diameter D1 of the flange 112d. Because the width D2 of the inwardly biased wings 110c of the first coupling element 110 is less than the diameter D1 of the flange 112d of the second coupling element 112, relative axial movement between the first and the second coupling elements 110, 112 when they are coupled together is prevented.

With continued reference to FIG. 10, the connector 110a includes a length L3 which extends above the inwardly biased wings 110c and the length L2 is within the inwardly biased wings 110c. The length L3 can be placed within the outlet 112c of the second coupling element 112 (shown in FIG. 5) prior to the remaining length L2 and can be used as a guide.

FIG. 11 shows a bottom view of the first coupling element 110. As indicated by arrows on the controls 110d, the controls 110d are configured to move inward and outward during operation.

As described above, the controls 110d can be moved inward by the user, which move the outwardly biased wings 110f inward. Such a movement causes the inwardly biased wings 110c to moved outward, thus allowing the second coupling element 112 (shown in FIG. 5) to be removed from the first coupling element 110.

As described above, the controls 110d can be moved inward when the inwardly biased wings 110c are forced away from the connector 110a when the second coupling element 112 is inserted into the first coupling element 110. Specifically, as the inwardly biased wings 110c are forced outward by the flange 112d (shown in FIG. 5) and the inwardly biased wings 110c move inward with the outwardly biased wings 110f. Once the inwardly biased wings 110c extend back inward, the outwardly biased wings 110f move outward and thereby force the controls 110d outward.

Figure 13:
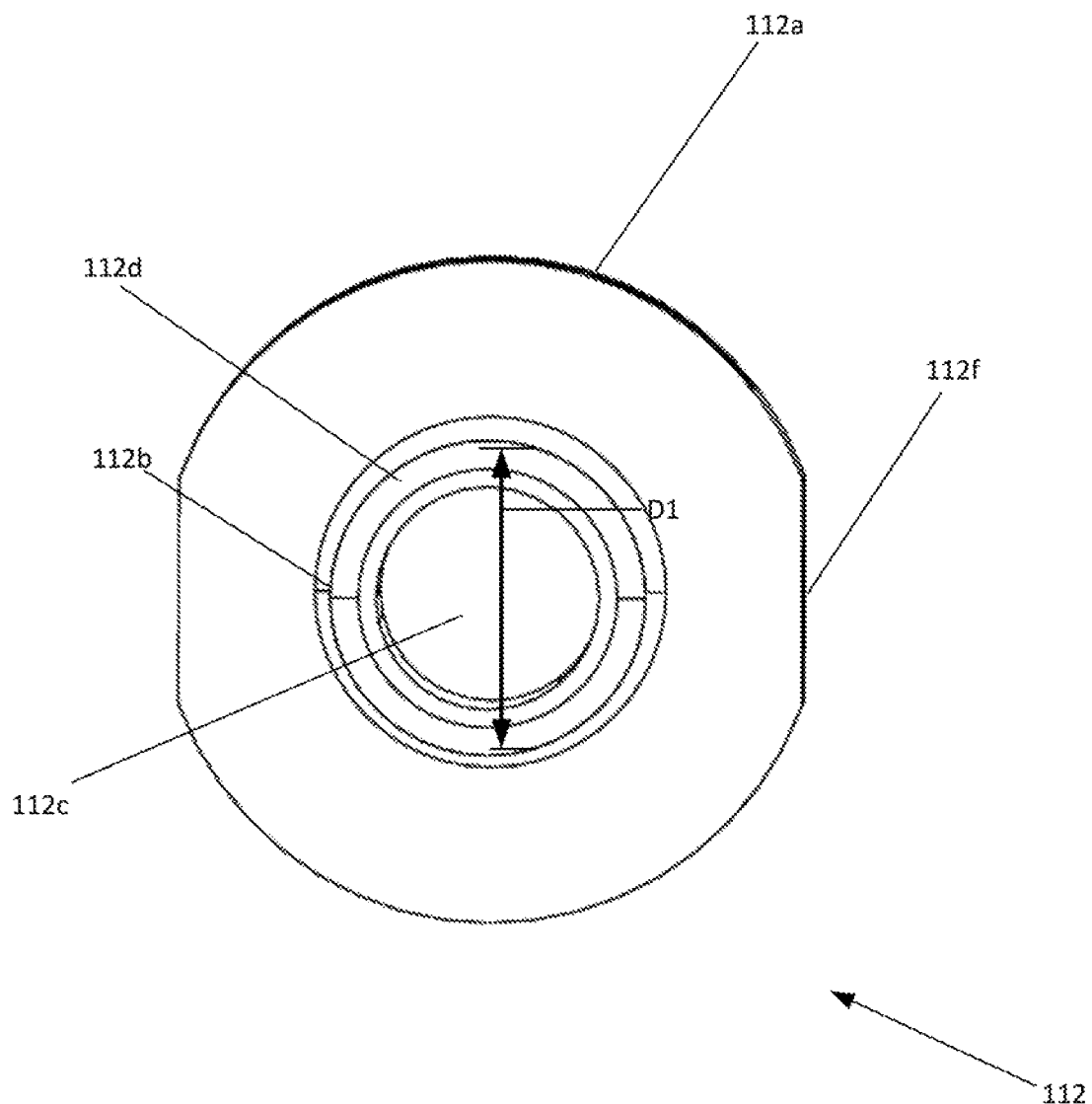
FIG. 13 is a bottom view of the second coupling element of FIG. 5 in isolation.
Figure 14:
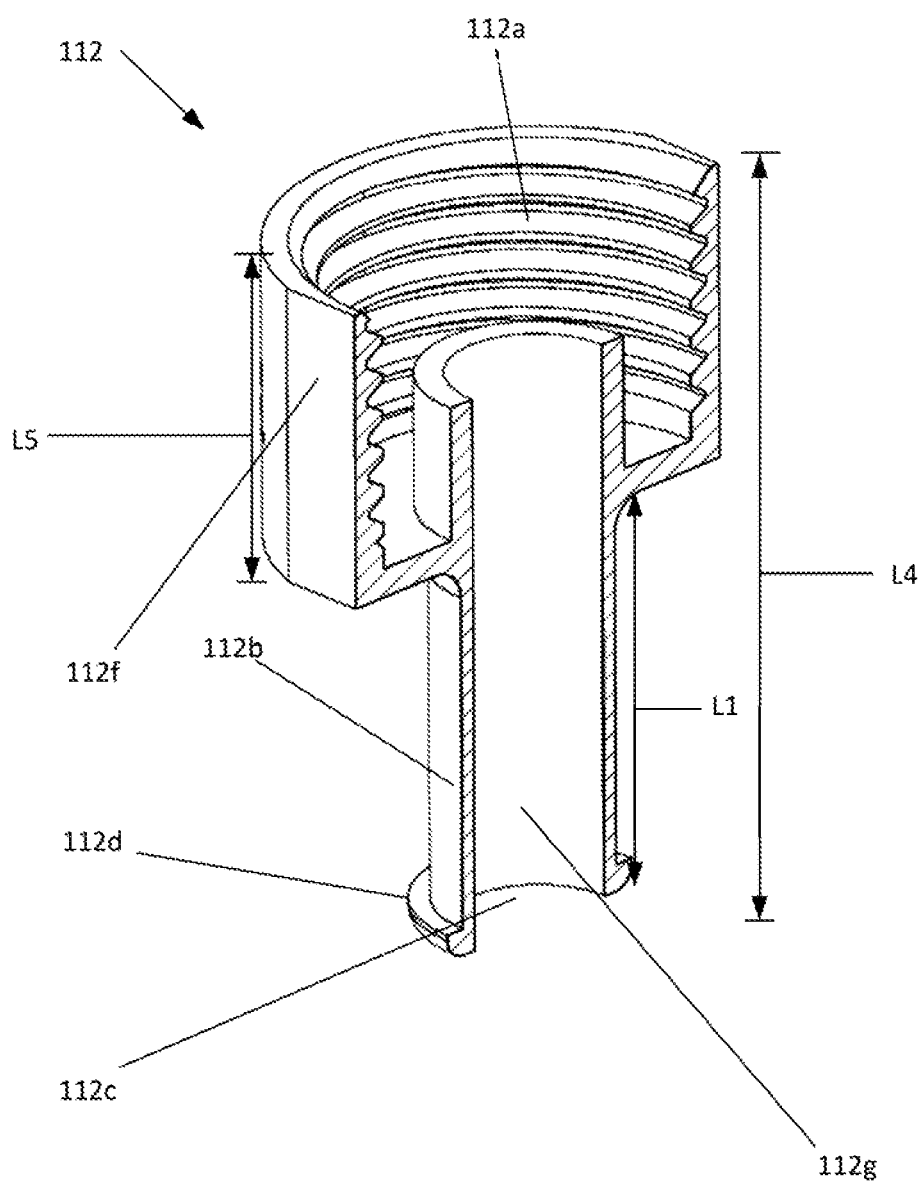
FIG. 14 is a perspective, cross-sectional view of the second coupling element of FIG. 5 in isolation.

FIGS. 12-14 show the second coupling element 112 in isolation. The second coupling element 112 has a longitudinal length L4. The second coupling element 112 includes the securing portion 112a axially adjacent the male coupling portion 112b. The securing portion 112a is configured to be secured to the shower arm 118 (shown in FIGS. 1-4) by the user. In some examples, the securing portion 112a can be circular in shape. In some examples, the securing portion 112a can include rounded portions 112e and flattened portions 112f. The flattened portions 112f allow for the second coupling element 112 to easily be connected to the shower arm 118 using a wrench.

As can be seen in FIG. 14, the second coupling element 112 includes a longitudinal channel 112g. This allows for fluid to flow along the fluid path F (shown in FIG. 4) directly from the shower arm 118, into the longitudinal channel 112g of the second coupling element 112, into the fluid channel 110h (shown in FIG. 10) of the first coupling element, and exit through the water dispersing mechanism 116 (shown in FIGS. 1-4).

Figure 15:
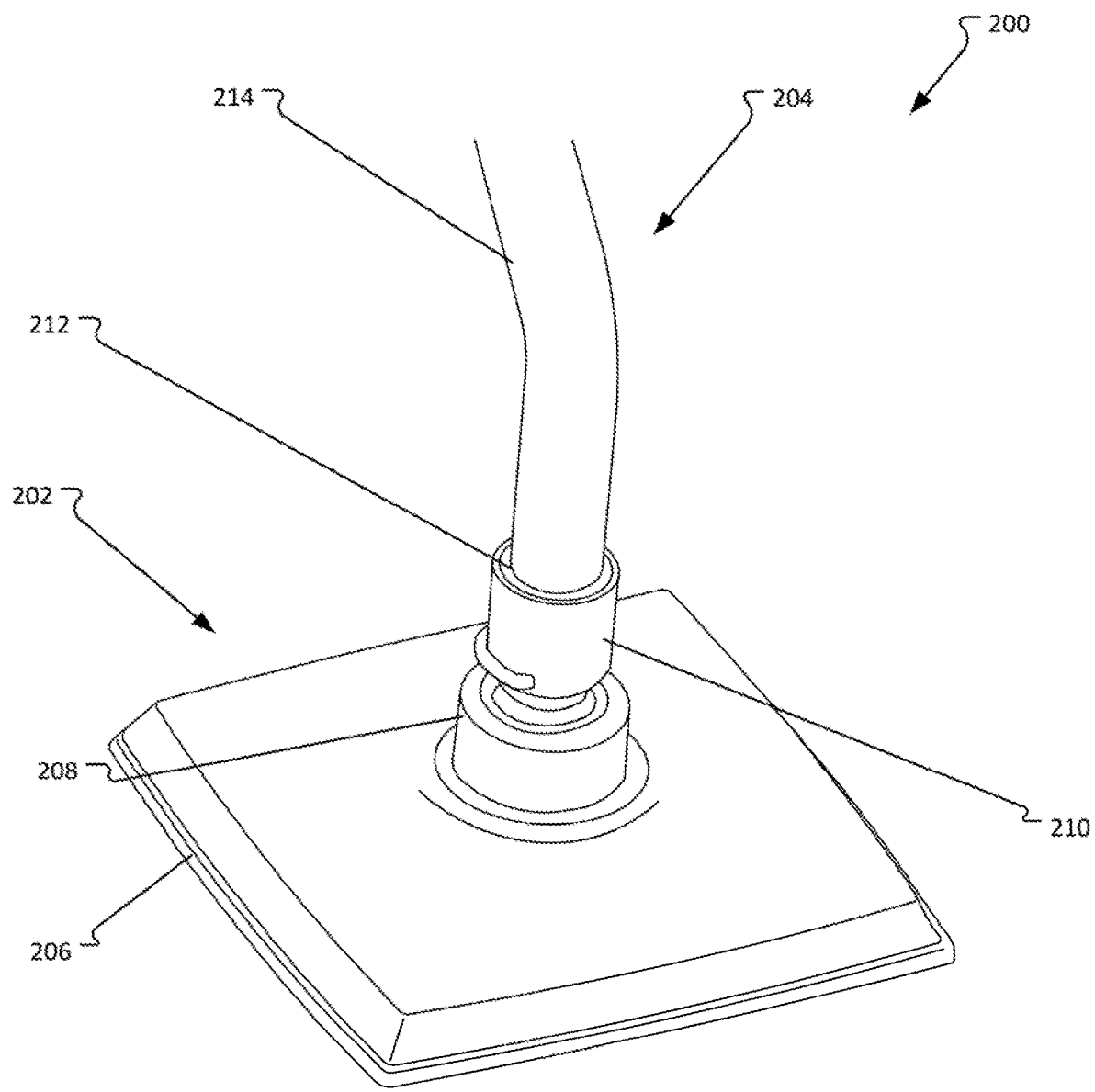
FIG. 15 is a perspective view of another water dispensing system in accordance with the principles of the present disclosure.

FIG. 15 is a perspective view of another water dispensing system 200. Similar to the example described above in FIGS. 1-14, the water dispensing system 200 is a shower head assembly. The water dispensing system 200 includes a head assembly 202 coupled to a shower arm assembly 204. The head assembly 202 includes a water dispersing mechanism 206 such as a showerhead, a housing 208, and a first coupling element 210. The shower arm assembly 204 includes a second coupling element 212 and a shower arm 214 that acts as a supply pipe for the showerhead. The first coupling element 210 and the second coupling element 212 are configured to releasably couple together so that the water dispersing mechanism 206 can couple in fluid communication with the shower arm 214. The first and second coupling elements 210, 212 form a quick connect coupling to easily attach the head assembly 202 to the shower arm assembly 204. In this example, however, the structure of the first and second coupling elements 210, 212 is different than the example described above.

Figure 16:
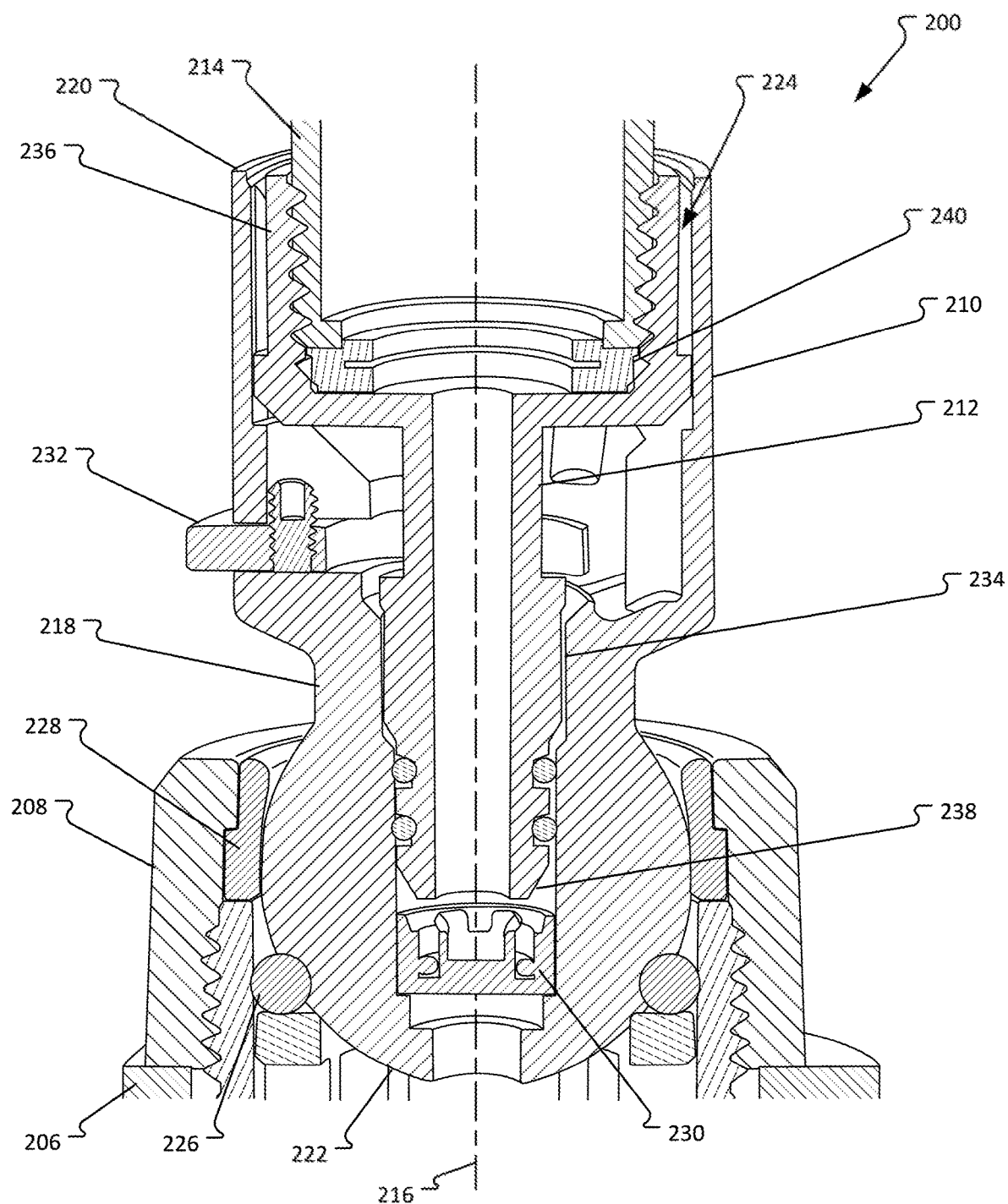
FIG. 16 is a cross-sectional view of the water dispensing system of FIG. 15.

FIG. 16 is a cross-sectional view of the water dispensing system 200. As illustrated in FIG. 16, the first coupling element 210 is coupled to the second coupling element 212 such that a flow path extending along a longitudinal axis 216 is formed between the shower arm 214 and the water dispersing mechanism 206. The first coupling element 210 has a body 218 with a first end 220 and an opposite second end 222. The first coupling element 210 is configured as a female adapter that at least partially receives the second coupling element 212. The first end 220 defines an interior chamber 224 that receives the second coupling element 212 and the second end 222 is configured to attach to the water dispersing mechanism 206 via the housing 208. In the example, the second end 222 is a ball shape such that a ball joint connection is formed between the first coupling element 210 and the water dispersing mechanism 206. As such, an angular position the water dispersing mechanism 206 is adjustable relative to the shower arm 214.

The housing 208 may be threaded with the water dispersing mechanism 206 so as to receive the second end 222 of the first coupling element 210 and enable movement thereof. In an example, a seal 226 (e.g., an O-ring) may be used to reduce or prevent water leakage and a collar 228 may be used to facilitate retaining position of the water dispersing mechanism 206. In an aspect, the collar 228 may be formed from a resilient material. A flow regulator 230 is supported within the second end 222 of the first coupling element 210 so as to regulate flow into the water dispersing mechanism 206.

A locking slide, also known as a retention clip, 232 is disposed at least partially within the first end 220 of the first coupling element 210 and is configured to translate relative to the body 218 in a direction that is orthogonal to the longitudinal axis 216. The locking slide 232 is configured to selectively retain the second coupling element 212 within the first coupling element 210. In the example, the locking slide 232 is movable between at least a first position or a retention position (as illustrated in FIG. 16) and a second position or a release position. The locking slide 232 is spring-biased towards the first position. As such, the second coupling element 212 can be inserted along the longitudinal axis 216 and displace the locking slide 232 towards the second position until the locking slide 232 can move back towards the first position and engage with the second coupling element 212. At least a portion of the locking slide 232 is accessible from the exterior of the water dispensing system 200 so that a user can manually release the first coupling element 210 from the second coupling element 212 by depressing the locking slide 232 towards the second position and withdrawing the first coupling element 210 from the second coupling element 212.

The second coupling element 212 has a body 234 with a first end 236 and an opposite second end 238. The second coupling element 212 is configured as a male adapter that at least partially inserts into the first coupling element 210. As such, the female adapter (e.g., the first coupling element 210) is releasably engageable to the male adapter (e.g., the second coupling element 212). The first end 236 is configured to attach to the shower arm 214 with interior threading and the second end 238 is configured to be inserted into the first coupling element 210. The first end 236 may thread onto the shower arm 214 and a seal 240 may be used therebetween as required or desired.

Figure 17:
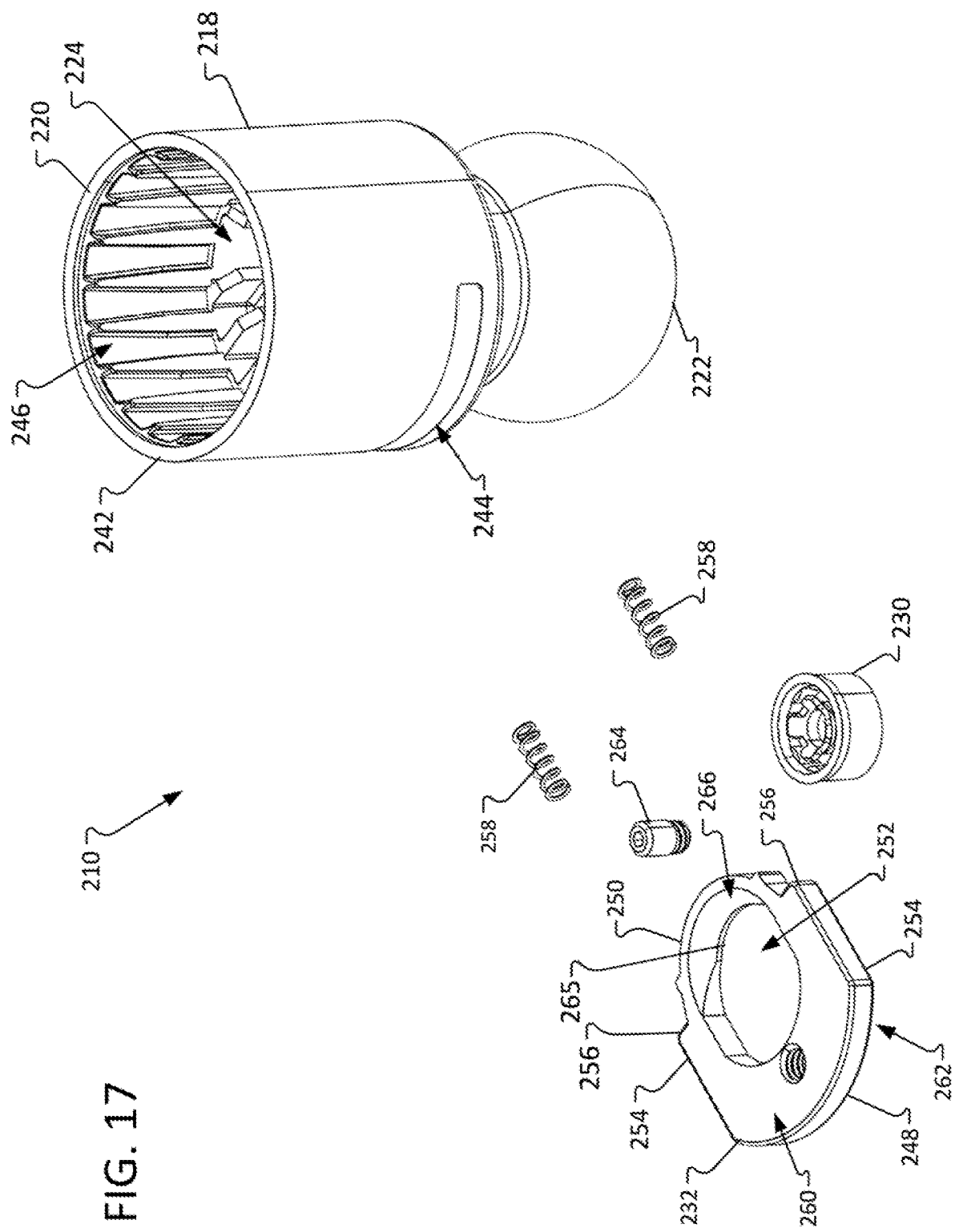
FIG. 17 is an exploded perspective view of a first coupling element of the water dispensing system of FIG. 15.

FIG. 17 is an exploded perspective view of the first coupling element 210. The first coupling element 210 includes the body 218 having the first end 220 and the second end 222. The first end 220 includes a cylindrical exterior wall 242 forming a sleeve and defining the interior chamber 224. A slot 244 is defined through the exterior wall 242 that is sized and shaped to enable the locking slide 232 to extend into the interior chamber 224 and slide relative thereto. An interior surface of the exterior wall 242 includes a plurality of axial channels 246 that extend from the first end 220 towards the second end 222. The axial channels 246 are shaped and sized to at least partially receive the second coupling element 212 (shown in FIG. 16) so at to restrict rotation around the longitudinal axis 216 (shown in FIG. 16) when the second coupling element 212 is coupled to the first coupling element 210.

The locking slide 232 has a first end 248 that extends through the slot 244 of the exterior wall 242 and which is accessible to the user. An opposite second end 250 of the locking slide 232 is configured to be completely disposed within the interior chamber 224. The second end 250 defines an opening 252 that is configured to receive the second coupling element 212. The locking slide 232 is a planar component that includes a pair of opposing parallel sides 254 that extend between the first end 248 and the second end 250. A spring seat 256 is defined on each side 254 adjacent the opening 252 to at least partially receive an end of a biasing spring 258 for biasing the position of the locking slide 232. In the example, the first coupling element 210 includes two biasing springs 258 that are disposed on both sides 254 of the locking slide 232 adjacent the opening 252. The biasing springs 258 extend between the locking slide 232 and the body 218 so as to bias the locking slide 232 towards the first position.

In the example, the locking slide 232 also includes a top surface 260 and an opposite bottom surface 262. A stop pin 264 is configured to extend from the top surface 260 and parallel to the longitudinal axis 216. The stop pin 264 is captured at least partially by the exterior wall 242 to retain the locking slide 232 within the interior chamber 224. The stop pin 264 may attach to the locking slide 232 by a threaded connection so that during assembly, the second end 250 of the locking slide 232 can be inserted into the interior chamber 224 and then from the first end 220 of the body 218, the stop pin 264 can be coupled to the top surface 260 of the locking slide 232. As such, the stop pin 264 is accessible from within the interior chamber 224 to facilitate assembly thereof. The stop pin 264 is configured to prevent removal of the locking slide 232 from the slot 244 when the second coupling element 212 is not attached. In an aspect, the stop pin 264 is disposed completely within the body 218 of the first coupling element 210. As such, the stop pin 264 is not accessible from the exterior of the body 218. Rather, the stop pin 264 is accessible through the open first end 220 of the body 218.

The second end 250 of the locking slide 232 includes a retention edge 265 that selectively engages with the second coupling element 212. The retention edge 265 can include a ramped surface 266 that at least partially defines the opening 252. The ramped surface 266 is angled into the opening 252 and is configured to at least partially contact the second coupling element 212 during insertion into the first coupling element 210 so as to move the locking slide 232 towards a second position and allow the second coupling element 212 to slide therein until engagement. The first coupling element 210 also includes the flow regulator 230. The flow regulator 230 is positioned proximate the second end 222 and below the locking slide 232.

In an example, the locking slide 232 (e.g., retention clip) may be formed from a hard material such as metal. In an aspect, the locking slide 232 may be formed from the same or a similar material to the body 218 as required or desired.

FIG. 18 is a cross-sectional view of the first coupling element 210 with the locking slide 232 in a first position or retention position. FIG. 19 is another cross-sectional view of the first coupling element 210 with the locking slide 232 in the first position or retention position. Referring concurrently to FIGS. 18 and 19, the first position (e.g., retention position) is configured to engage with the second coupling element 212 (shown in FIG. 16), however, the second coupling element 212 is not illustrated for clarity. More specifically, the retention edge 265 of the second end 250 of the locking slide 232 is configured to engage with the second coupling element 212 when the second coupling element 212 is being inserted so as to displace the locking slide 232 towards a second position or release position (shown in FIG. 20) and allow the second coupling element 212 to insert into the first coupling element 210. Once the second coupling element 212 is inserted within the first coupling element 210, the locking slide 232 returns to the first position so as to retain the second coupling element 212 within the first coupling element 210.

The body 218 of the first coupling element 210 has a longitudinal channel 268 shaped and sized to receive at least a portion of the second coupling element 212 and form a fluid seal to allow water to pass therethrough. A diameter 270 of the interior chamber 224 at the first end 220 is greater than a diameter 272 of the longitudinal channel 268. This configuration enables the second coupling element 212 to be received more easily. The longitudinal channel 268 may have any number of stepped surfaces 274 that facilitate aligning the second coupling element 212 within the first coupling element 210 as it is being inserted. The flow regulator 230 is supported within the longitudinal channel 268 proximate the second end 222 of the body 218.

The body 218 of the first coupling element 210 includes one or more interior walls 276 within the interior chamber 224 that facilitate supporting the locking slide 232 and the biasing springs 258 therein. For example, the body 218 defines spring pockets 278 within the interior chamber 224 that at least partially receive ends of the biasing springs 258. In another example, the body 218 defines a stop pin pocket 280 within the interior chamber 224 that enables the stop pin 264 to slide therein, but not allow the locking slide 232 to be removed from the interior chamber 224 when the stop pin 264 is coupled thereto. In the example, the biasing springs 258 and the stop pin 264 are disposed completely within the body 218 of the first coupling element 210 and no portions of the biasing springs 258 or the stop pin 264 are exposed outside of the body 218. Similarly, the second end 250 of the locking slide 232 is also disposed completely within the body 218 and not exposed outside of the body 218. This configuration enables the first coupling element 210 to have increased performance and design.

The biasing springs 258 are disposed on the same plane with the locking slide 232 and biases the first end 248 of the locking slide 232 outwards as illustrated by arrows 282 and in the first position. The sliding direction of the locking slide 232 is orthogonal to the longitudinal axis 216. When the locking slide 232 is in the first position, the first end 248 is in its most extended position from the body 218 and the retention edge 265 of the second end 250 is located at least partially within the longitudinal channel 268. Additionally, when the locking slide 232 is in the first position, the opening 252 and the retention edge 265 are at least partially offset from and not aligned with the longitudinal channel 268. In an aspect, the ramped surface 266 is located at least partially above the longitudinal channel 268. When the second coupling element 212 is inserted into the first coupling element 210, at least a portion of the second coupling element 212 is configured to contact the ramped surface 266 to direct it into the opening 252 and to urge the locking slide 232 towards the second position and overcome the biasing force of the biasing springs 258. Additionally, once the second coupling element 212 is within the first coupling element 210, the second end 250 of the locking slide 232 is biased towards the first position so as to engage with the second coupling element 212 and retain and maintain a relative axial positioning of it within the body 218 and as illustrated in FIG. 16. As such, the bottom surface of the ramped surface 266 is a planar surface for this retaining engagement function.

In the example, the second end 250 of the locking slide 232 may include one or more notches 284 that correspond in shape and size to the position of one or more of the interior walls 276 to facilitate positioning of the locking slide 232 within the interior chamber 224 in the second position that is described further below in reference to FIG. 20.

FIG. 20 is a cross-sectional view of the first coupling element 210 with a locking slide 232 in a second position or release position. FIG. 21 is another cross-sectional view of the first coupling element 210 with the locking slide 232 in the second position or release position.

Referring concurrently to FIGS. 20 and 21, the second position (e.g., release position) is configured to release the second coupling element 212 (shown in FIG. 16), however, the second coupling element 212 is not illustrated for clarity. Additionally, certain components are described above and not necessarily described further. More specifically, the retention edge 265 of the second end 250 of the locking slide 232 is configured to release the second coupling element 212 so that the second coupling element 212 can slide in and out of the locking slide 232 depending on whether the second coupling element 212 is being inserted or removed from the first coupling element 210. When the second coupling element 212 is inserted into the first coupling element 210, the ramped surface 266 and the structure of the second coupling element 212 enables the locking slide 232 to automatically be moved towards the second position. When the second coupling element 212 is being removed from the first coupling element 210, the first end 248 of the locking slide 232 may be manually depressed so as to move towards the second position.

In the example, when the locking slide 232 is in the second position, the opening 252 of the locking slide 232 aligns with the longitudinal channel 268 of the body 218 so that the second coupling element 212 can more easily slide in and out. As illustrated in FIGS. 20 and 21, the stop pin 264 moves away from the exterior wall 242 while the first end 248 of the locking slide 232 moves inward towards the interior chamber 224 as shown by arrows 286. In aspects, the interior walls 276 of the body 218 may form as a stop for the locking slide 232 in the second position.

Figure 22:
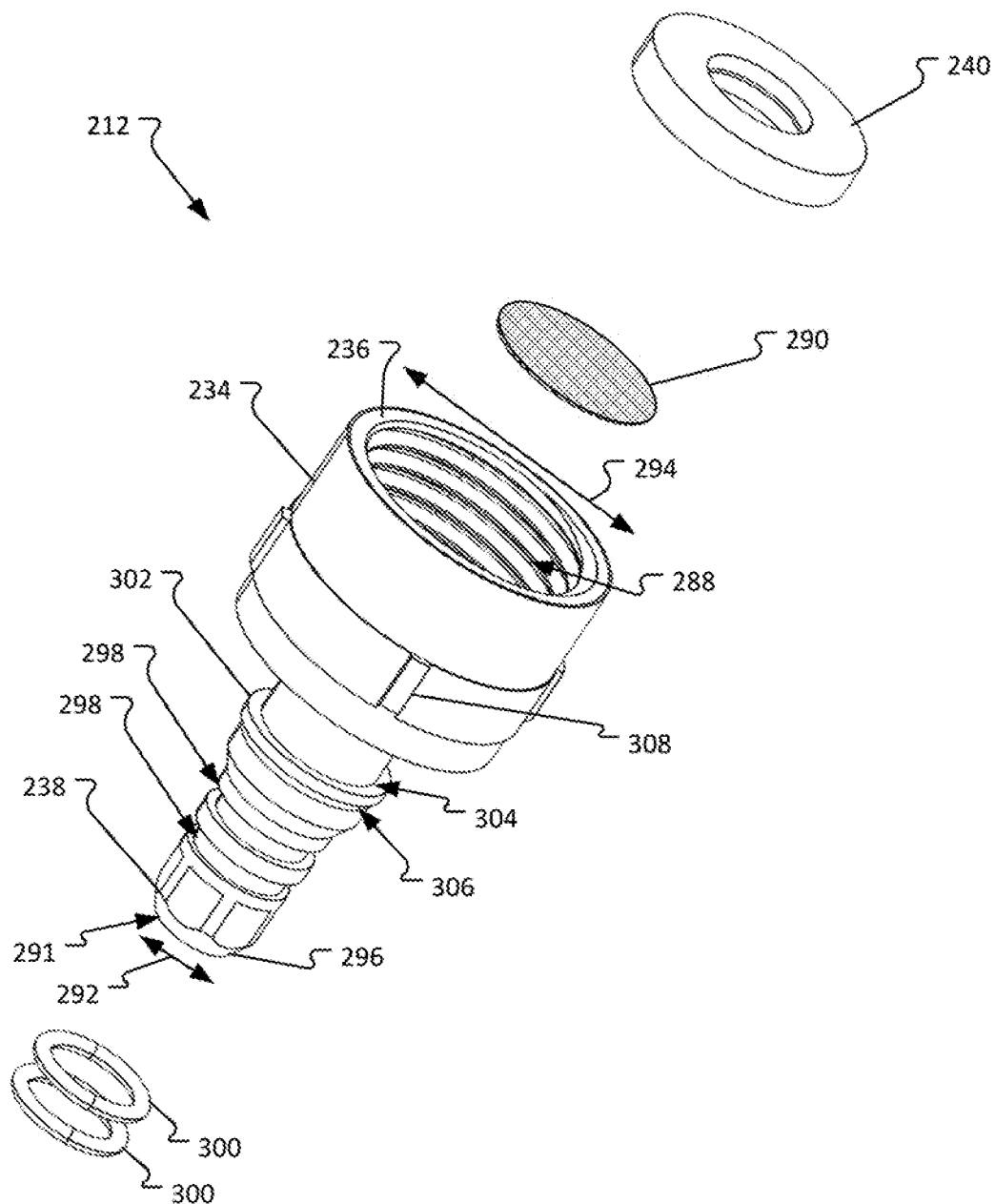
FIG. 22 is an exploded perspective view of a second coupling element of the water dispensing system of FIG. 15.

FIG. 22 is an exploded perspective view of the second coupling element 212. The second coupling element 212 includes the body 234 with the first end 236 and the second end 238 that extends along the longitudinal axis 216 (shown in FIG. 16). The body 234 defines a longitudinal channel 288 configured to allow water to flow therethrough. The first end 236 is configured to couple to the shower arm 214 (shown in FIG. 16) via interior threads. In examples, the seal 240 and/or a screen 290 may be used with this threaded connection. The second end 238 has a fluid aperture 291 and is configured to be inserted into the first coupling element 210 from the first end 220 (both shown in FIG. 17). In the example, an outer diameter 292 of the second end 238 is less than an outer diameter 294 of the first end 236 to facilitate insertion into the first coupling element 210.

The second end 238 includes an outer chamfered edge 296 that facilitates the insertion into the first coupling element 210 and alignment therein. In an aspect, the outer chamfered edge 296 is configured to contact at least a portion of the locking slide 232 (shown in FIG. 16) so as to move position thereof (e.g., the ramped surface 266). One or more indented channels 298 may be formed in the body 234 proximate the second end 238 to support one or more outer circumferential seals 300 (e.g., O-rings) for coupling the second coupling element 212 in fluid communication with the first coupling element 210 with a fluid seal.

The body 234 also includes an outer circumferential shoulder 302 disposed between the first end 236 and the second end 238 of the second coupling element 212. The outer circumferential shoulder 302 extends radially and has a larger diameter than the second end 238 and is configured to selectively engage with the locking slide 232 to retain the second coupling element 212 within the first coupling element 210. In the example, the outer circumferential shoulder 302 includes a top surface 304 that extends orthogonal to the longitudinal axis 216 and selectively engages with the locking slide 232. The outer circumferential shoulder 302 also includes a tapered bottom surface 306 that enables the outer circumferential shoulder 302 to slide through the locking slide 232.

The first end 236 of the body 234 has an exterior surface that includes one or more lugs 308. The lugs 308 are shaped and sized to be received within corresponding axial channels 246 (shown in FIG. 17) within the first coupling element 210 so that when the first coupling element 210 is attached to the second coupling element 212 rotation of the first coupling element 210 around the longitudinal axis 216 is restricted. As such, rotation around the longitudinal axis 216 is prevented between the first coupling element 210 and the second coupling element 212 when they are coupled together.

In operation, the interior chamber 224 (shown in FIG. 17) of the sleeve of the first coupling element 210 is configured to receive at least a portion of the second end 238 of the second coupling element 212 to releasably couple the elements in fluid communication. During longitudinal movement of the second coupling element 212 into the interior chamber 224, the second end 238 of the second coupling element 212 inserts into the opening 252 (shown in FIG. 17) of the locking slide 232 such that the locking slide 232 engages with the outer circumferential shoulder 302 when the locking slide 232 is in the first position (shown in FIGS. 18-19). To release the second coupling element 212 from the first coupling element 210, the locking slide 232 is configured to be manually depressed to move the locking slide 232 towards the second position (shown in FIGS. 20-21) and release engagement with the outer circumferential shoulder 302.

Figure 23:
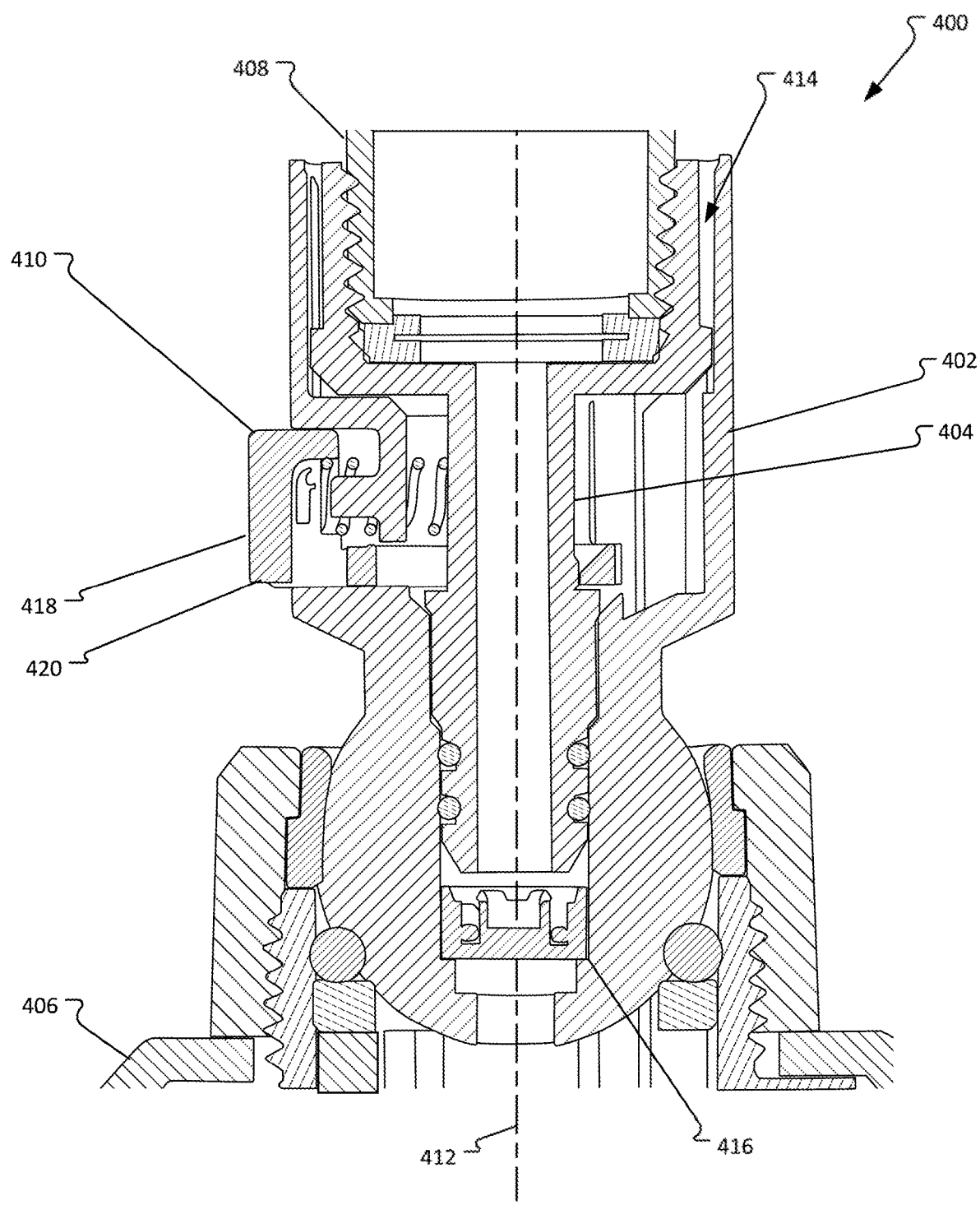
FIG. 23 is a partial cross-section view of another water dispensing system in accordance with the principles of the present disclosure.

FIG. 23 is a cross-section view of another water dispensing system 400. Similar to the example described above in FIGS. 15-22, the water dispensing system 400 includes a female first coupling element 402 that releasably couples to a male second coupling element 404 so as to couple in fluid communication a water dispersing mechanism 406 with a shower arm 408. In this example, however, a locking slide or retention clip 410 of the first coupling element 402 has a different structure. The first and second coupling elements 402, 404 form a quick connect coupling to easily attach the water dispersing mechanism 406 and the shower arm 408.

As illustrated in FIG. 23, the first coupling element 402 is coupled to the second coupling element 404 such that a flow path extending along a longitudinal axis 412. The first coupling element 402 has a first end sleeve that defines an interior chamber 414 configured as a female coupling member that at least partially receives the second coupling element 404. A second end of the first coupling element 402 is configured to attach to the water dispersing mechanism 406 and is a ball shape such that a ball joint connection is formed between the first coupling element 402 and the water dispersing mechanism 406. A flow regulator 416 is supported within the second end of the first coupling element 402 so as to regulate flow into the water dispersing mechanism 406.

Similar to the example described above (the locking slide 232), the locking slide 410 is disposed at least partially within the first coupling element 402 and is configured to translate in a direction that is orthogonal to the longitudinal axis 412. The locking slide 410 is configured to selectively retain the second coupling element 404 within the first coupling element 401. The locking slide 410 is movable between at least a first position or retention position (as illustrated in FIG. 23) and a second position or release position while being biased towards the first position. In this example, the locking slide 410 includes a button 418 extending from a first end 420 of the locking slide 410. The button 418 is accessible from the exterior of the water dispensing system 400 so that a user can manually release the first coupling element 402 from the second coupling element 404 by depressing the locking slide 410 towards the second position and withdrawing the first coupling element 402 from the second coupling element 404. The second coupling element 404 has a first end that is configured to attach to the shower arm 408 and a second end that is configured as a male coupling member to be inserted into the first coupling element 402. In the example, the second coupling element 404 is substantially similar to the second coupling element 212 described and shown in FIG. 22.

Figure 24:
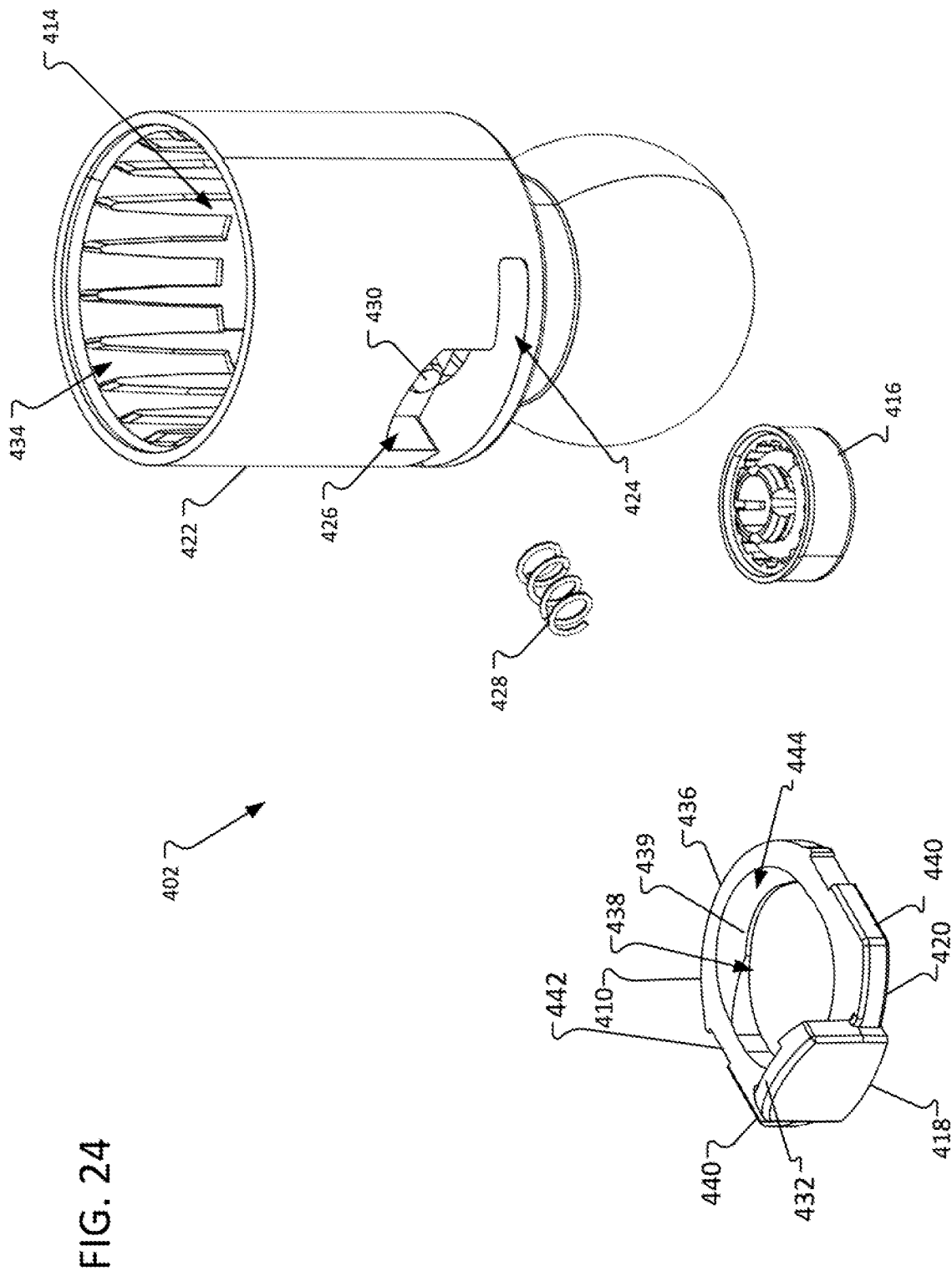
FIG. 24 is an exploded perspective view of a first coupling element of the water dispensing system of FIG. 23.

FIG. 24 is an exploded perspective view of the first coupling element 402. A cylindrical exterior wall 422 such as a sleeve defines the interior chamber 414 for receiving the second coupling element 404 (shown in FIG. 23). A slot 424 is defined through the exterior wall 422 that is sized and shaped to enable the locking slide 410 to extend into the interior chamber 414 and slide relative thereto. In the example, the slot 424 includes a recess 426 defined in the exterior wall 422 that is sized and shaped to receive the button 418 of the locking slide 410. Unlike the slot 424, the recess 426 does not extend completely through the exterior wall 422. Rather, the recess 426 has a depth to receive the button 418 and a biasing spring 428 so as to bias the position of the locking slide 410 towards the first position as described herein. In an aspect, the recess 426 extends upward from the slot 424 in an axial direction and may be substantially U-shaped. A cylindrical projection 430 extends within the recess 426 so at to support one end of the biasing spring 428. The biasing spring 428 is a single biasing spring and extends between the button 418 and the exterior wall 422 within the recess 426. In an aspect, a rear side of the button 418 may include a groove 432 for supporting the other end of the biasing spring 428.

An interior surface of the exterior wall 422 includes a plurality of axial channels 434 that at least partially receive the second coupling element 404 so at to restrict rotation around the longitudinal axis 412 (shown in FIG. 23) when the second coupling element 404 is coupled to the first coupling element 402. The flow regulator 416 is positioned below the locking slide 410.

The locking slide 410 has the first end 420 with the button 418 that extends through the slot 424 of the exterior wall 422 and which is accessible to the user. In an aspect, the button 418 is unitary with the first end 420. An opposite second end 436 of the locking slide 410 is configured to be disposed completely within the interior chamber 414. The second end 436 defines an opening 438 with a retention edge 439 that is configured to receive the second coupling element 404. The locking slide 410 includes a pair of opposing parallel sides 440 that extend between the first end 420 and the second end 436. At least one notch 442 is defined on each side 440 adjacent the opening 438 of the locking slide 410 configured to engage with the exterior wall 422 and retain the locking slide 410 within the interior chamber 414. The second end 436 of the locking slide 410 also includes a ramped surface 444 that at least partially defines the opening 438 configured to at least partially contact the second coupling element 404 during insertion into the first coupling element 402.

In an example, the locking slide 410 (e.g., retention clip) may be formed from a plastic or other resilient, deformable material such that the notches 442 can engage within the interior chamber 414 when the locking slide 410 is being assembled into the slot 424. In an aspect, the locking slide 410 is formed from a different material type than the body of the first coupling element 402.

Figure 26:
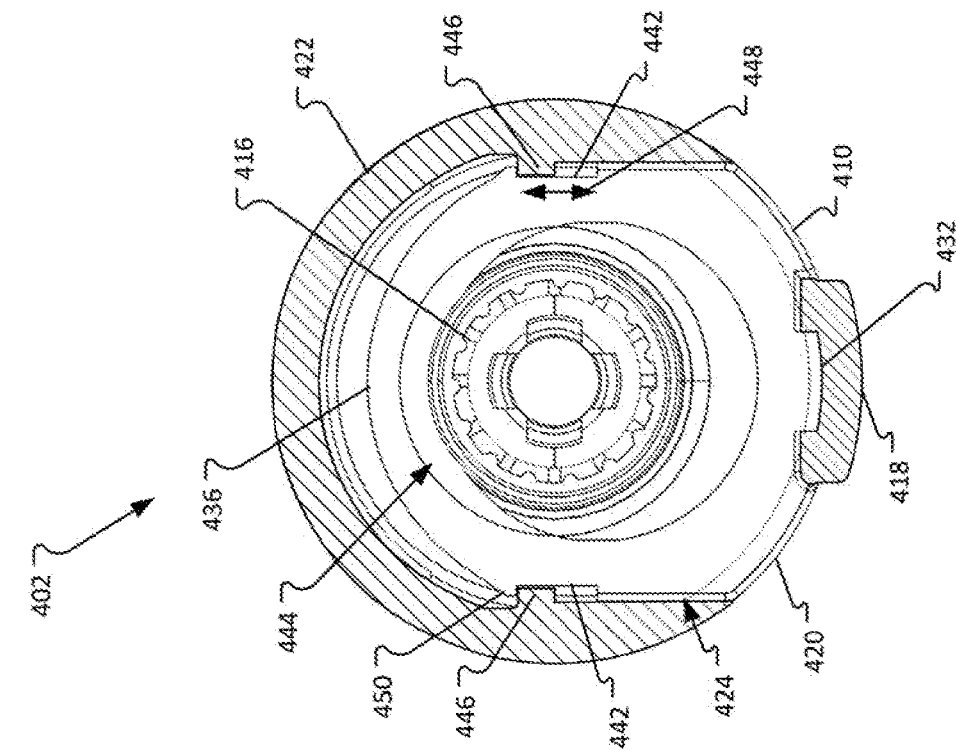
FIG. 26 is another cross-sectional view of the first coupling element of FIG. 24 with the locking slide in the first position.
Figure 25:
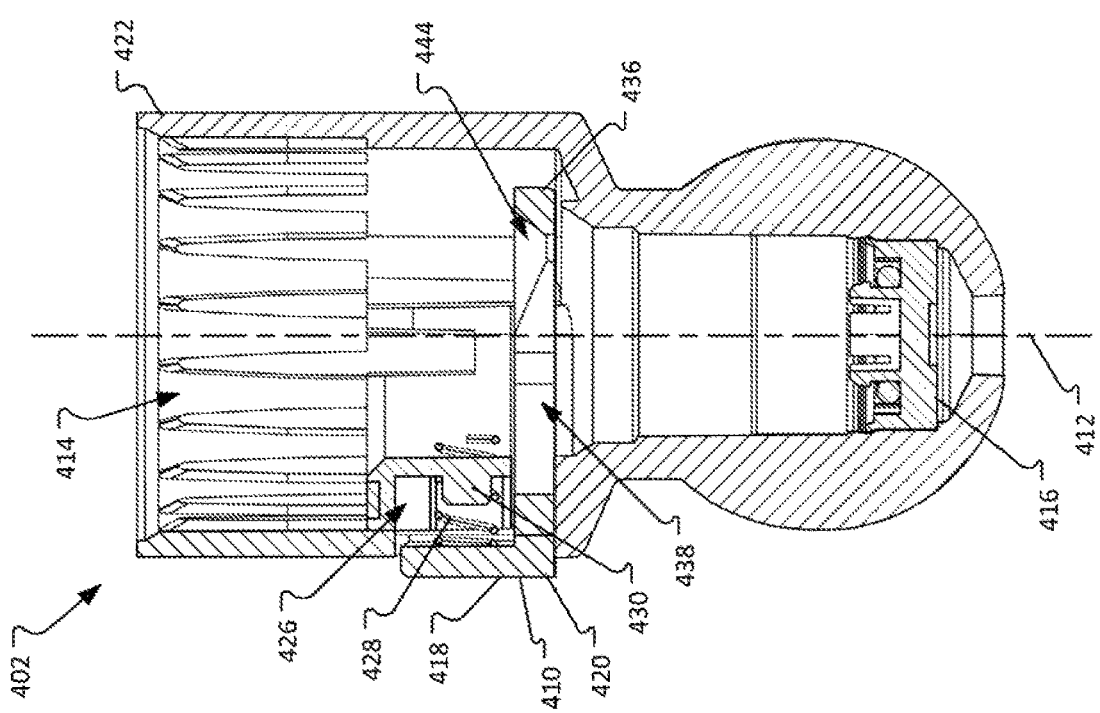
FIG. 25 is a cross-sectional view of the first coupling element of FIG. 24 with a locking slide in a first position.

FIG. 25 is a cross-sectional view of the first coupling element 402 with the locking slide 410 in a first position or release position. FIG. 26 is another cross-sectional view of the first coupling element 402 with the locking slide 410 in the first position or release position. Referring concurrently to FIGS. 25 and 26, the first position (e.g., release position) is configured to engage with the second coupling element 404 (shown in FIG. 23), however, the second coupling element 404 is not illustrated for clarity. Additionally, certain components are described above and not necessarily further. In the example, the second end 436 of the locking slide 410 is configured to engage with the second coupling element 404 as described herein. As such, when the second coupling element 404 is being inserted, the locking slide 410 is displaced towards a second position (not shown) and allow the second coupling element 404 to insert into the first coupling element 402. Additionally, once the second coupling element 404 is inserted within the first coupling element 402, the locking slide 410 returns to the first position so as to retain the second coupling element 404 within the first coupling element 402 via engagement with the outer shoulder.

The first coupling element 402 includes one or more interior walls 446 within the interior chamber 414 that facilitate supporting the locking slide 410 therein. The interior walls 446 are received at least partially within the notches 442 of the locking slide 410. The notches 442 have a length 448 that enables the locking slide 410 to move between the first and second positions as described herein and to prevent removal of the locking slide 410 from the slot 424 when the second coupling element 404 is not attached. It should be appreciated that unintentional/undesirable removal of the locking slide 410 is reduced or prevented from shipping, installation, and use conditions however, with sufficient force, the locking slide 410 is removable and insertable for assembly as required or desired. In the example, at least a portion of the sides 450 maybe curved to facilitate installation.

The biasing spring 428 is parallel to and offset from the plane of the locking slide 410 and biases the first end 420 of the locking slide 410 outwards towards the first position. The locking slide 410 is moveable towards a second position (not shown) via longitudinal insertion of the second coupling element 404 or manually by the button 418 and as described herein. In the example, the biasing spring 428 is disposed outside of the interior chamber 414, but covered by the button 418. In an aspect, by using the biasing spring 428, the button 418 is enabled to be substantially rigid and increase performance of the locking slide 410.

Figure 27:
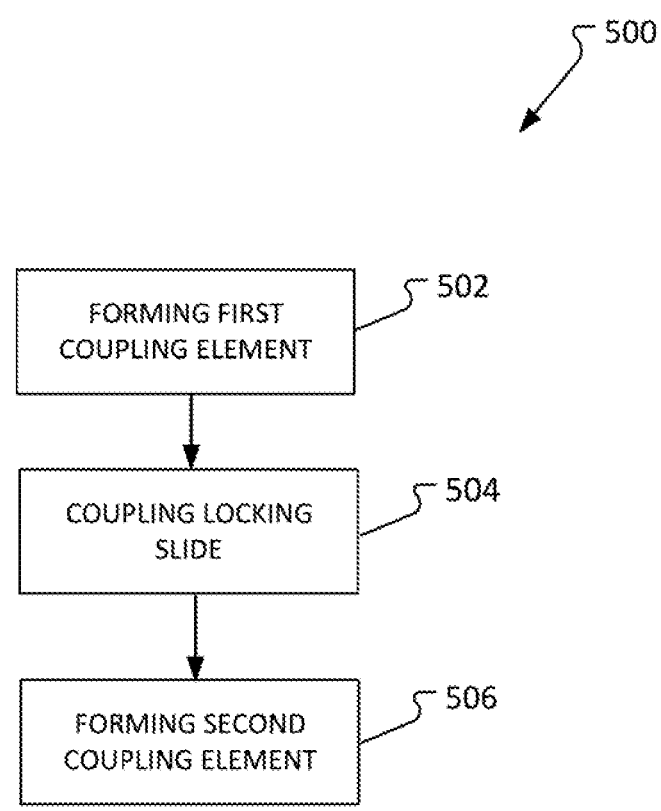
FIG. 27 is a flowchart illustrating an exemplary method for manufacturing a water dispensing system in accordance with the principles of the present disclosure.

FIG. 27 is a flowchart illustrating an exemplary method 500 for manufacturing a water dispensing system. The water dispensing system may be the same or similar to the examples described above. The method 500 begins with forming a first coupling element body (operation 502). In examples, the first coupling element body includes a first end with an exterior wall defining an interior chamber and a slot is defined in the exterior wall, and an opposite second end configured to attach to a first water dispensing component. A locking slide is coupled to the first coupling element body (operation 504). The locking slide is disposed at least partially within the interior chamber with at least one biasing spring extending between the locking slide and the first end of the body. The locking slide is attached such that the locking slide is translatable between at least a first position and a second position in a direction that is orthogonal to a longitudinal axis of the first coupling element. The locking slide has a first end extending through the slot of the exterior wall and an opposite second end disposed completely within the interior chamber. The locking slide is biased towards the first position.

The method 500 further includes forming a second coupling element body (operation 506). In examples, the second coupling element body has a first end configured to attach to a second water dispensing component, an opposite second end with an outer chamfered edge, and an outer circumferential shoulder. The interior chamber of the first coupling element body is configured to receive at least a portion of the second end of the second coupling element body to releasably couple the first water dispensing component in fluid communication with the second water dispensing component. During longitudinal movement of the second end of the second coupling element body into the interior chamber, the second end of the second coupling element body inserts into an opening of the locking slide such that the locking slide engages with the outer circumferential shoulder in the first position, and the first end of the locking slide is configured to be manually depressed to move the locking side towards the second position and release engagement with the outer circumferential shoulder.

The quick connect assemblies (e.g., the male/female adapters and/or the first/second coupling elements) described above are illustrated as being utilized for a shower head configured to releasably attach to a shower arm. However, it is considered within the scope of the present disclosure that the quick connect assemblies described herein can be utilized for many different other uses as required or desired while using the principles of the present disclosure. For example, the quick connect assembly may be incorporated into a handheld shower attachment so that the shower attachment can quickly connect to the hose or the hose can quickly connect to the wall mount. The trim for handheld shower attachment may also be releasably attached via the structure used in the quick connect assemblies.

Staying in the bath area, the quick connect assemblies may be used to attach cleaning accessories, handheld brush/combs, pet grooming/cleaning accessories, and any other accessory to the shower arm or other water source. The structure used in the quick connect assemblies may also be used in attaching filter attachments, aromatherapy attachments, vitamin D attachments, and the like to the shower head or a bathtub spout. Bathtub spouts may use the quick connect assemblies to attach within the bath and/or switch out the trim thereof.

Bath faucets may also use the quick connect assemblies described herein. For example, to be able to change out aerators or heads, to incorporate attachments such as a spray head, water floss, side sprayer, brush, etc. Kitchen faucets may also use the quick connect assemblies for the same or similar incorporations and to swap attachments and/or accessories. Trim for kitchen and bath faucets may also be replaceable or switchable using the quick connect assemblies so that the housings above the deck can be updated. Inlet valves at stub outs, e.g., angle valves, may use the quick connect assembles to attach a water line thereto. Other supply lines (e.g., to the faucet or shower) may use the quick connect assemblies.

Outside of kitchen and bath areas, garden hose attachments may use the quick connect assemblies described herein. Pressure washing systems may also use the quick connect assemblies. Other use based configurations are also contemplated herein for the quick connect assemblies.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. A shower head assembly comprising:
   a male adapter having a first end and a second end, the first end having an interior threading for connection to a supply pipe and at least one lug on an exterior surface, the second end having a fluid aperture at a chamfered edge, at least one outer circumferential seal, and an outer circumferential shoulder positioned towards the first end from the at least one outer circumferential seal; and
   a showerhead having a female adapter releasably engageable to the male adapter, the female adapter including:
   a longitudinal channel sized to receive at least a portion of the second end of the male adapter and form a fluid seal against the at least one outer circumferential seal;
   a retention clip movable between a release position and a retention position, the retention clip being spring-biased toward the retention position and having a retention edge positioned at least partially within the longitudinal channel when in the retention position, the retention edge engaging with the outer circumferential shoulder of the male adapter to maintain a relative axial positioning of the male adapter and the female adapter; and
   a sleeve positioned over the first end and at least a portion of the second end of the male adapter when engaged to the male adapter, the sleeve having at least one interior axial channel engaging with the at least one lug on the exterior surface of the first end of the male adapter to limit rotational movement of the female adapter relative to the male adapter.

2. The shower head assembly of claim 1, wherein the female adapter has a first end including the sleeve and an opposite second end, the second end of the female adapter having a ball shape such that a ball joint connection is formed between the female adapter and the showerhead.

3. The shower head assembly of claim 1, wherein the retention edge of the retention clip is fully disposed within the female adapter in both the release position and the retention position.

4. The shower head assembly of claim 1, wherein the retention clip defines an opening configured to receive the second end of the male adapter, the retention edge at least partially defining the opening.

5. The shower head assembly of claim 1, further comprising a flow regulator disposed within the female adapter.

6. The shower head assembly of claim 1, wherein the retention clip has a first end and an opposite second end, the first end of the retention clip includes a stop pin extending therefrom and the second end of the retention clip includes the retention edge, the stop pin captured at least partially by the sleeve to retain the retention clip within the sleeve.

7. The shower head assembly of claim 6, wherein the stop pin is configured to prevent removal of the retention clip from the female adapter when the male adapter is not attached.

8. The shower head assembly of claim 1, wherein the female adapter includes a pair of biasing springs disposed on both sides of the retention clip proximate the retention edge.

9. The shower head assembly of claim 8, wherein the sleeve defines a pair of spring pockets to at least partially receive a first end of the pair of biasing springs.

10. The shower head assembly of claim 9, wherein a pair of spring seats are defined on both sides of the retention clip proximate the retention edge, the pair of spring seats at least partially receive a second end of the pair of biasing springs.

11. The shower head assembly of claim 8, wherein the pair of biasing springs are disposed on the same plane with the retention clip.

12. The shower head assembly of claim 1, wherein the retention clip includes a button extending from the retention clip opposite the retention edge.

13. The shower head assembly of claim 12, wherein the female adapter includes a biasing spring extending between the button and the sleeve.

14. The shower head assembly of claim 13, wherein at least one notch is defined on opposing sides of the retention clip and configured to engage the sleeve to retain the retention clip within the sleeve.

15. The shower head assembly of claim 1, wherein the retention clip is configured to be manually depressed to move the retention clip towards the release position.

16. The shower head assembly of claim 1, wherein the outer circumferential shoulder has a larger diameter than a diameter of the second end of the male adapter.

17. The shower head assembly of claim 1, wherein the outer circumferential shoulder includes a first surface facing the first end of the male adapter and a second surface facing the second end of the male adapter, and wherein the first surface is orthogonal to a longitudinal axis of the male adapter and the second surface is tapered.

18. The shower head assembly of claim 4, wherein the retention edge includes a ramped surface at least partially defining the opening of the retention clip.

19. The shower head assembly of claim 12, wherein the female adapter defines a slot that slidably receives the retention clip, wherein the slot includes a recess that at least partially receives the button.

20. The shower head assembly of claim 19, wherein the recess extends in an axial direction and is U-shaped.

* * * * *